United States Patent
Miyagawa

(10) Patent No.: US 12,422,846 B2
(45) Date of Patent: Sep. 23, 2025

(54) INFORMATION PROCESSING DEVICE AND INFORMATION PROCESSING METHOD

(71) Applicant: SONY GROUP CORPORATION, Tokyo (JP)

(72) Inventor: Hiroshi Miyagawa, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 204 days.

(21) Appl. No.: 17/598,019

(22) PCT Filed: Apr. 1, 2020

(86) PCT No.: PCT/JP2020/015119
§ 371 (c)(1),
(2) Date: Sep. 24, 2021

(87) PCT Pub. No.: WO2020/209167
PCT Pub. Date: Oct. 15, 2020

(65) Prior Publication Data
US 2022/0187828 A1 Jun. 16, 2022

(30) Foreign Application Priority Data
Apr. 8, 2019 (JP) .................. 2019-073429

(51) Int. Cl.
*B64U 101/30* (2023.01)
*B64U 10/13* (2023.01)
(Continued)

(52) U.S. Cl.
CPC ......... *G05D 1/0094* (2013.01); *G05D 1/0016* (2013.01); *B64U 10/13* (2023.01);
(Continued)

(58) Field of Classification Search
CPC .. G05D 1/0094; G05D 1/0016; B64C 39/024; B64D 47/08; B64U 2201/20; B64U 2101/30
See application file for complete search history.

(56) References Cited

U.S. PATENT DOCUMENTS

| 11,086,313 B2* | 8/2021 | Tsaplin ................. G06F 1/1698 |
| 2014/0008496 A1* | 1/2014 | Ye ........................ G05D 1/0038 244/190 |

(Continued)

FOREIGN PATENT DOCUMENTS

| CN | 102266672 A | 12/2011 |
| CN | 103426282 A | 12/2013 |

(Continued)

OTHER PUBLICATIONS

International Search Report and Written Opinion of PCT Application No. PCT/JP2020/015119, issued on Jun. 30, 2020, 09 pages of ISRWO.

*Primary Examiner* — Jelani A Smith
*Assistant Examiner* — Hana Lee
(74) *Attorney, Agent, or Firm* — CHIP LAW GROUP

(57) ABSTRACT

Provided is an information processing device including a parameter generation unit that generates a movement parameter for controlling movement of a mobile body based on a ratio between a first distance from a reference body which is a reference for the movement of the mobile body to a first position and a second distance from the mobile body to a second position, and movement of the reference body.

12 Claims, 20 Drawing Sheets

(51) Int. Cl.
*B64U 20/87* (2023.01)
*G05D 1/00* (2006.01)

(52) U.S. Cl.
CPC .......... *B64U 20/87* (2023.01); *B64U 2101/30* (2023.01); *B64U 2201/20* (2023.01)

(56) References Cited

U.S. PATENT DOCUMENTS

| | | | |
|---|---|---|---|
| 2015/0370250 A1* | 12/2015 | Bachrach | G05D 1/0044 |
| | | | 701/2 |
| 2016/0344981 A1* | 11/2016 | Lunt | G08G 5/0026 |
| 2018/0292214 A1 | 10/2018 | Zhang | |
| 2019/0310659 A1 | 10/2019 | Zheng et al. | |
| 2019/0324447 A1* | 10/2019 | Ryan | B64U 10/13 |
| 2020/0346753 A1* | 11/2020 | Qian | G06V 20/13 |
| 2021/0160749 A1* | 5/2021 | Lu | H04W 36/328 |

FOREIGN PATENT DOCUMENTS

| | | |
|---|---|---|
| CN | 105031935 A | 11/2015 |
| CN | 106808473 A | 6/2017 |
| CN | 108292140 A | 7/2018 |
| CN | 108780316 A | 11/2018 |
| CN | 109481943 A | 3/2019 |
| EP | 2959352 A1 | 12/2015 |
| EP | 3387506 A1 | 10/2018 |
| EP | 3538970 A1 | 9/2019 |
| FR | 2953014 A | 5/2011 |
| JP | 2002-135641 A | 5/2002 |
| JP | 2006051864 A | 2/2006 |
| JP | 2013012128 A | 1/2013 |
| JP | 2015-091282 A | 5/2015 |
| JP | 2017-509034 A | 3/2017 |
| JP | 6114865 B1 | 4/2017 |
| JP | 6138326 B1 | 5/2017 |
| JP | 2018144772 A | 9/2018 |
| JP | 2018-201119 A | 12/2018 |
| JP | 2018-537335 A | 12/2018 |
| JP | 2020-502714 A | 1/2020 |
| KR | 20170059893 A | 5/2017 |
| TW | 201522164 A | 6/2015 |
| WO | 2015/014116 A1 | 2/2015 |
| WO | 2017/096548 A1 | 6/2017 |
| WO | 2018/108162 A1 | 6/2018 |
| WO | 2018/214401 A1 | 11/2018 |

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2020/015119 filed on Apr. 1, 2020, which claims priority benefit of Japanese Patent Application No. JP 2019-073429 filed in the Japan Patent Office on Apr. 8, 2019. Each of the above-referenced applications is hereby incorporated herein by reference in its entirety.

FIELD

The present disclosure relates to an information processing device, an information processing method, and a program.

BACKGROUND

Conventionally, a technology for controlling movement of a robot according to movement of a user has been proposed. For example, Patent Literature 1 describes a technology for linking movement of a mobile robot on which a video camera is mounted to movement of a user.

Further, Patent Literature 1 discloses a technology in which a ratio between a movement amount of a user and a movement amount of a mobile robot is set to a specific ratio in advance, and movement of the mobile robot is linked to movement of the user based on the specific ratio.

CITATION LIST

Patent Literature

Patent Literature 1: JP 2002-135641 A

SUMMARY

Technical Problem

When controlling movement of a mobile body such as the mobile robot, it is estimated that the user may want to move the mobile body by a large amount. In such a case, in the technology described in Patent Literature 1, in a case where the user wants to move the mobile body by a large amount, the user himself/herself also needs to move by a large amount, and thus, a burden on the user increases.

In addition, even in a case where the ratio between the movement amount of the user and the movement amount of the mobile body is set to the specific ratio as described above, it is considered that the ratio is not appropriately selected in some cases depending on an operation environment of the mobile body.

Therefore, the present disclosure proposes a new and improved information processing device, information processing method, and program capable of more easily controlling movement of a mobile body.

Solution to Problem

According to the present disclosure, an information processing device is provided that includes: a parameter generation unit that generates a movement parameter for controlling movement of a mobile body based on a ratio between a first distance from a reference body which is a reference for the movement of the mobile body to a first position and a second distance from the mobile body to a second position, and movement of the reference body.

Moreover, according to the present disclosure, an information processing method is provided that includes: generating, by a processor, a movement parameter for controlling movement of a mobile body based on a ratio between a first distance from a reference body which is a reference for the movement of the mobile body to a first position and a second distance from the mobile body to a second position, and movement of the reference body.

Moreover, according to the present disclosure, a program is provided that causes a computer to perform: a function of generating a movement parameter for controlling movement of a mobile body based on a ratio between a first distance from a reference body which is a reference for the movement of the mobile body to a first position and a second distance from the mobile body to a second position, and movement of the reference body.

DESCRIPTION OF EMBODIMENTS

Hereinafter, a preferred embodiment of the present disclosure will be described in detail with reference to the appended drawings. Note that, in the present specification and the drawings, components having substantially the same functional configuration are provided with the same reference signs, so that repeated description of these components is omitted.

Figure 1:
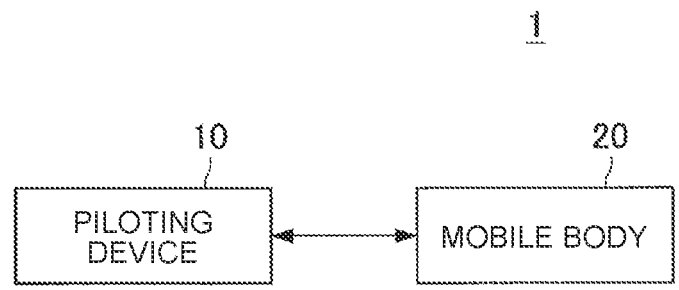
FIG. 1 is a block diagram illustrating a configuration of an information processing system according to an embodiment of the present disclosure.

Note that the description will be provided in the following order.
1. Configuration of Information Processing System
1.1. Configuration of Piloting Device
1.2. Configuration of Mobile Body
1.3. Configuration of Information Processing Device
1.4. Coordinate System
2. Processing Example
2.1. First Processing Example
2.2. Second Processing Example
2.3. Supplementary Description of Calculation Method
3. Modified Example
4. Hardware Configuration Example
5. Supplementary Description 1. Configuration of Information Processing System First, a configuration of an information processing system 1 according to an embodiment of the present disclosure will be described with reference to FIG. 1. FIG. 1 is a block diagram illustrating the configuration of the information processing system 1 according to an embodiment of the present disclosure. As illustrated in FIG. 1, the information processing system 1 includes a piloting device 10 and a mobile body 20. In the present embodiment, the piloting device 10 and the mobile body 20 are positioned at places away from each other. Specifically, in the present embodiment, it is assumed that the piloting device 10 is positioned on the hand of a pilot on the ground, and the mobile body 20 flies and is in the sky. Further, the piloting device 10 and the mobile body 20 are communicably connected to each other. Note that, in the present embodiment, the pilot of the piloting device 10 is a user of an information processing device according to an embodiment of the present disclosure.

The piloting device 10 is a device having a function of piloting the mobile body 20. The pilot can pilot the mobile body 20 by using the piloting device 10. Further, the piloting device 10 functions as a reference body serving as a reference for movement of the mobile body 20. That is, as described later, when the piloting device 10 moves under a predetermined condition, the mobile body 20 moves in accordance with the movement of the piloting device 10.

Note that, in the present embodiment, the piloting device 10 moves by being carried by the pilot.

The mobile body 20 is not particularly limited, but may be a device having various movement functions. For example, the mobile body 20 may be an unmanned aircraft including a drone, a vehicle, a ship, or various robots. In the present embodiment, the mobile body 20 is a flying object capable of flying in the sky. More specifically, in the present embodiment, the mobile body 20 will be described as a drone. Furthermore, in the present embodiment, an image capturing device as described later is mounted on the mobile body 20, and can capture an image of a landscape.

1.1. Configuration of Piloting Device

Figure 2:
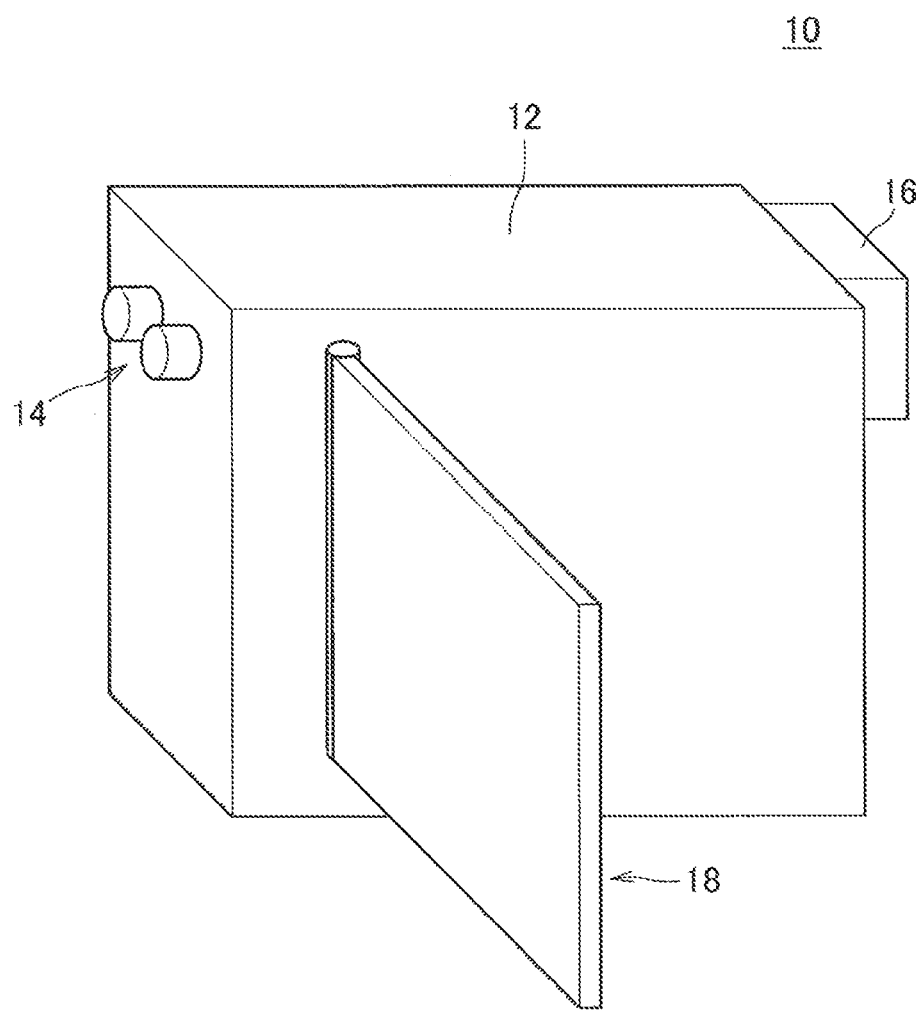
FIG. 2 is a view illustrating an appearance of a piloting device according to an embodiment of the present disclosure.
Figure 3:
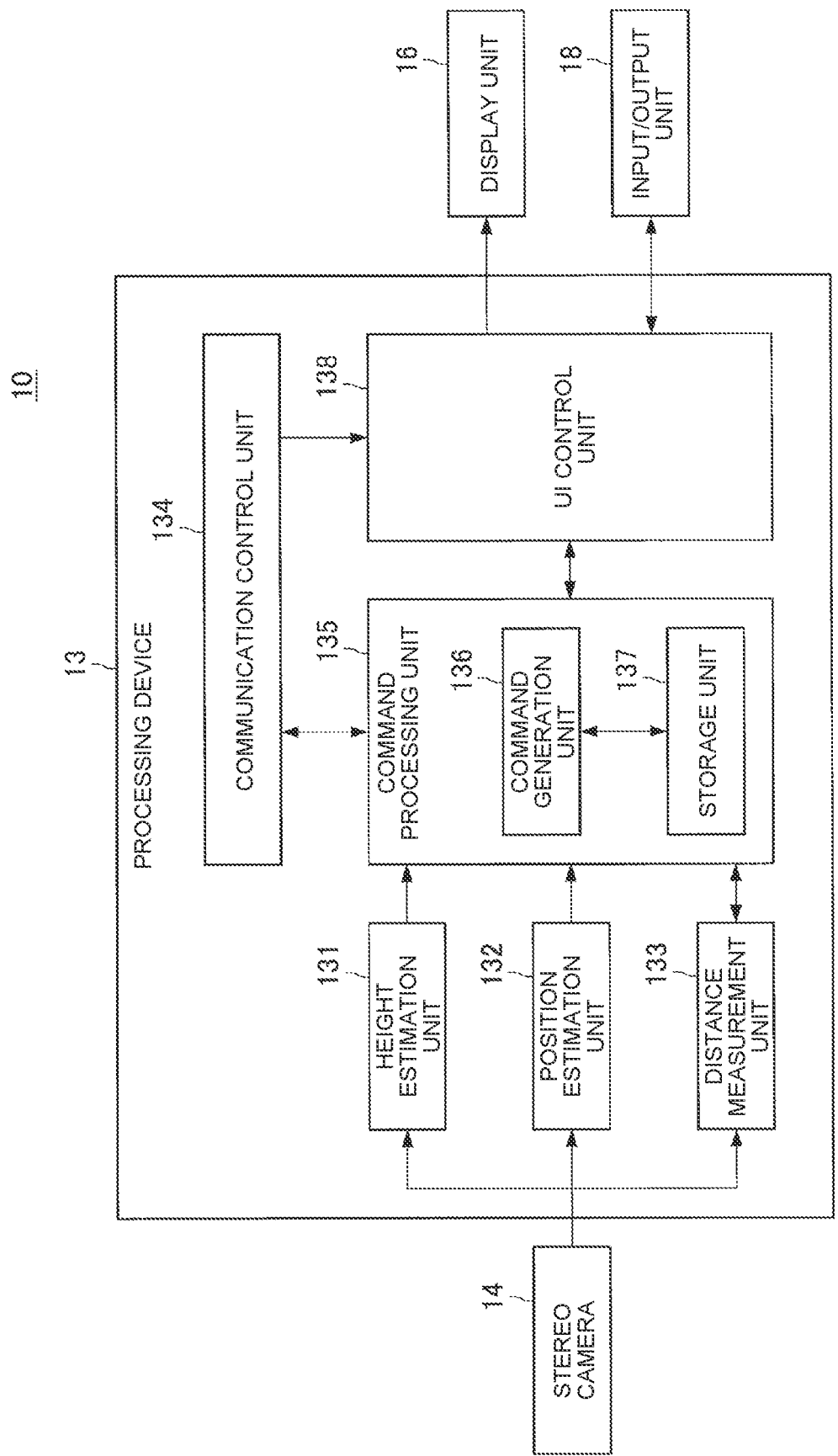
FIG. 3 is a functional block diagram illustrating a configuration of the piloting device according to an embodiment of the present disclosure.

Next, a configuration of the piloting device 10 according to an embodiment of the present disclosure will be described with reference to FIGS. 2 and 3. FIG. 2 is a view illustrating an appearance of the piloting device 10 according to an embodiment of the present disclosure.

As illustrated in FIG. 2, the piloting device 10 according to the present embodiment includes a housing 12, a stereo camera 14, a display unit 16, and an input/output unit 18. Hereinafter, each device included in the piloting device 10 will be described.

The housing 12 constitutes a main body portion of the piloting device 10. The pilot can carry the housing 12 and move the piloting device 10. A processing device 13 to be described with reference to FIG. 3 is provided inside the housing 12.

Next, a configuration of the processing device 13 provided inside the housing 12 according to an embodiment of the present disclosure will be described in detail with reference to FIG. 3. FIG. 3 is a functional block diagram illustrating a configuration of the piloting device 10 according to an embodiment of the present disclosure.

The stereo camera 14 has a function of capturing an image. In the present embodiment, the captured image is used to measure the self-position and the movement amount of the piloting device 10, or a distance in a forward direction of the pilot. In the present embodiment, the piloting device 10 measures various distances by using the stereo camera 14. Note that the piloting device 10 may be provided with various known devices for measuring a distance, such as an RBG-D camera, a time of flight (TOF) sensor, or a light detection and ranging (LiDAR). In this case, various distances may be measured by these devices instead of the stereo camera 14. Note that, in the present specification, the stereo camera 14 is also referred to as a first image capturing device. The stereo camera 14 transmits information regarding the measured distance or the captured image to a height estimation unit 131, a position estimation unit 132, or a distance measurement unit 133 as described later.

The display unit 16 has a function of displaying an image. For example, the display unit 16 may display an image captured by the image capturing device mounted on the mobile body 20 as described later.

The input/output unit 18 has a function of receiving an input of various types of information or outputting various types of information. For example, the input/output unit 18 may display a user interface (UI) for receiving an operation on the piloting device 10 from the pilot. The pilot can perform various operations on the piloting device 10 by touching a displayed screen or the like with reference to the display of the UI. Furthermore, the input/output unit 18 may display an image captured by the image capturing device mounted on the mobile body 20. The input/output unit 18 transmits the input information to a user interface (UI) control unit 138 as described later.

The processing device 13 has a function of performing various types of processing for piloting the mobile body 20. The functions of the processing device 13 according to the present embodiment are implemented by cooperation of the height estimation unit 131, the position estimation unit 132, the distance measurement unit 133, a communication control unit 134, a command processing unit 135, and the UI control unit 138 included in the processing device 13.

The height estimation unit 131 estimates a distance from the piloting device 10 to the ground. That is, the height estimation unit 131 estimates a height (hereinafter, also referred to as "above-ground height") of the piloting device 10 from the ground. More specifically, the height estimation unit 131 acquires an image from the stereo camera 14 and generates a distance image based on the acquired image. Furthermore, the height estimation unit 131 estimates the above-ground height by calculating the distance from the ground (plane) to the stereo camera 14 after detecting the ground by plane detection or the like from the distance image.

In addition, the height estimation unit 131 may estimate the above-ground height by using a TOF sensor instead of the stereo camera 14. In addition, the height estimation unit 131 may estimate the above-ground height by using a positional relationship between an augmented reality (AR) marker installed on the ground and the piloting device 10.

Here, the height estimation unit 131 may function as a first distance acquisition unit. Here, the first distance acquisition unit is a functional unit having a function of acquiring a first distance from the piloting device 10 to a first position based on information detected by various devices provided in the piloting device 10. In the present embodiment, the piloting device 10 is provided with the first distance acquisition unit. Therefore, the first distance is acquired more accurately. As a result, the pilot can control the movement of the mobile body 20 more accurately.

Furthermore, in the present embodiment, the movement of the mobile body 20 is controlled based on a ratio between the first distance from the piloting device 10 to the first position and a second distance from the mobile body 20 to a second position, and the movement of the piloting device 10. The first position is not particularly limited, but can be, for example, a ground positioned immediately below the piloting device 10. In this case, the first distance is the above-ground height of the piloting device 10. Furthermore, the first position may be a first gaze point at which the stereo camera 14 included in the piloting device 10 is gazed when capturing an image. Note that the first position may be a position of an object present in a gaze point direction from the piloting device 10. Here, the gaze point direction is a direction toward a second gaze point as described later based on the mobile body 20.

Furthermore, the second position is not particularly limited, but can be a ground positioned immediately below the mobile body 20. In this case, the second distance is the above-ground height of the mobile body 20. Furthermore, the second position may be the second gaze point at which an image capturing device 25 included in the mobile body 20 is gazed when capturing an image. Hereinafter, when the first gaze point and the second gaze point are not distinguished from each other, the first gaze point and the second gaze point are also simply referred to as "gaze points".

The position estimation unit 132 estimates the self-position of the piloting device 10. Note that, in the present specification, the self-position includes not only the position but also the posture. The position estimation unit 132 may acquire an image from the stereo camera 14 and estimate the self-position by performing simultaneous localization and mapping (SLAM) using the acquired image. Note that the position estimation unit 132 may estimate the self-position by using a TOF sensor instead of the stereo camera 14. Furthermore, the position estimation unit 132 may estimate the self-position by using the positional relationship between the installed AR marker and the piloting device 10.

The distance measurement unit 133 has a function of measuring various distances from the piloting device 10. For example, the distance measurement unit 133 may measure a distance from the piloting device 10 to an object present in the gaze point direction as described later.

In the present embodiment, an image captured by the image capturing device mounted on the mobile body 20 is displayed on the display unit 16 or the input/output unit 18. At this time, for example, the position or posture of the image capturing device mounted on the mobile body 20 or the mobile body 20 may be adjusted so that the second gaze point is at the center of the display.

The gaze point may be set by the pilot specifying a position on a preview image displayed on the input/output unit 18. The distance measurement unit 133 may measure a distance to an object, a wall, or the like present when viewing the gaze point direction from the piloting device 10 based on the image captured by the stereo camera 14. Furthermore, the distance measurement unit 133 may measure various distances by using a TOF sensor or the like instead of the stereo camera 14.

Here, the distance measurement unit 133 may function as the first distance acquisition unit. The distance measurement unit 133 may acquire the first distance with the gaze point captured by the stereo camera 14 included in the piloting device 10 as the first position.

The communication control unit 134 has a function of controlling wireless communication between the piloting device 10 and the mobile body 20. Various commands are transmitted from the piloting device 10 to the mobile body 20 through wireless communication, for example. Furthermore, for example, various types of information such as information regarding the state of the mobile body 20 or an image captured by the image capturing device mounted on the mobile body 20 are received through wireless communication.

The UI control unit 138 has a function of controlling the display unit 16 or the input/output unit 18 to cause the display unit 16 or the input/output unit 18 to display a UI of the piloting device 10. Furthermore, it is also possible to acquire the image of the image capturing device mounted on the mobile body 20 received by the communication control unit 134 and display the image on the display unit 16 or the input/output unit 18. Furthermore, the UI control unit 138 acquires a content of an operation performed on the input/output unit 18 and transmits the content of the operation to the command processing unit 135.

The command processing unit 135 has a function of performing processing related to a piloting command for controlling the state of the mobile body 20. The functions of the command processing unit 135 are implemented by cooperation of a command generation unit 136 and a storage unit 137.

The command generation unit 136 has a function of generating a piloting command for the mobile body 20 based on information received by the communication control unit 134, an operation input from the UI control unit 138, or information received from the height estimation unit 131, the position estimation unit 132, and the distance measurement unit 133 included in the piloting device 10. The command generation unit 136 transmits the generated command to the mobile body 20 via the communication control unit 134.

The storage unit 137 stores various types of information such as information for the command generation unit 136 to generate the piloting command or command information generated by the command generation unit 136. The information stored in the storage unit 137 is transmitted to the command generation unit 136 as necessary.

1.2. Configuration of Mobile Body

Figure 4:
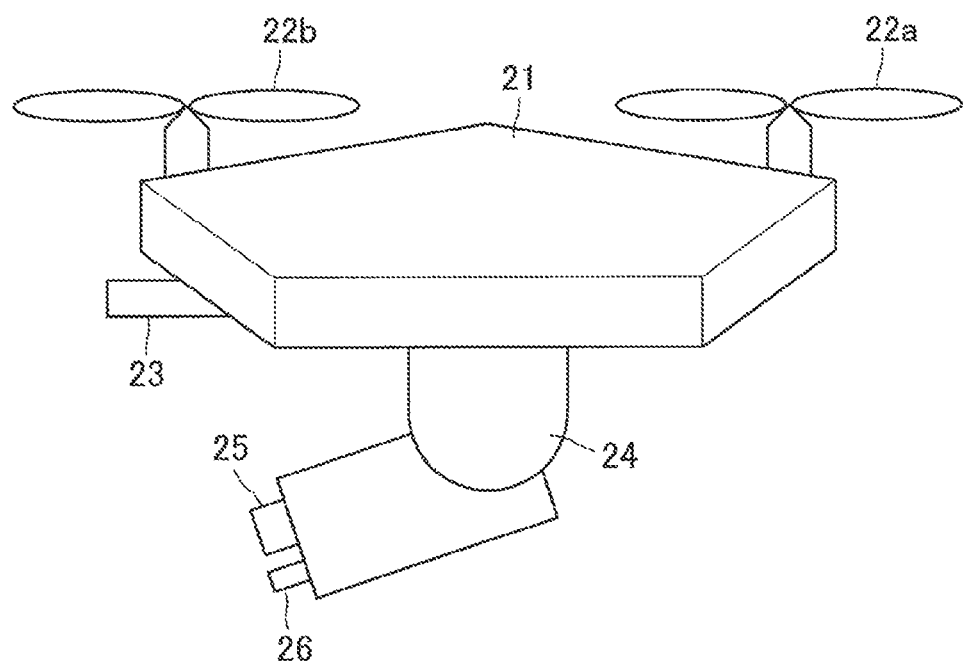
FIG. 4 is a view schematically illustrating an appearance of a mobile body according to an embodiment of the present disclosure.
Figure 5:
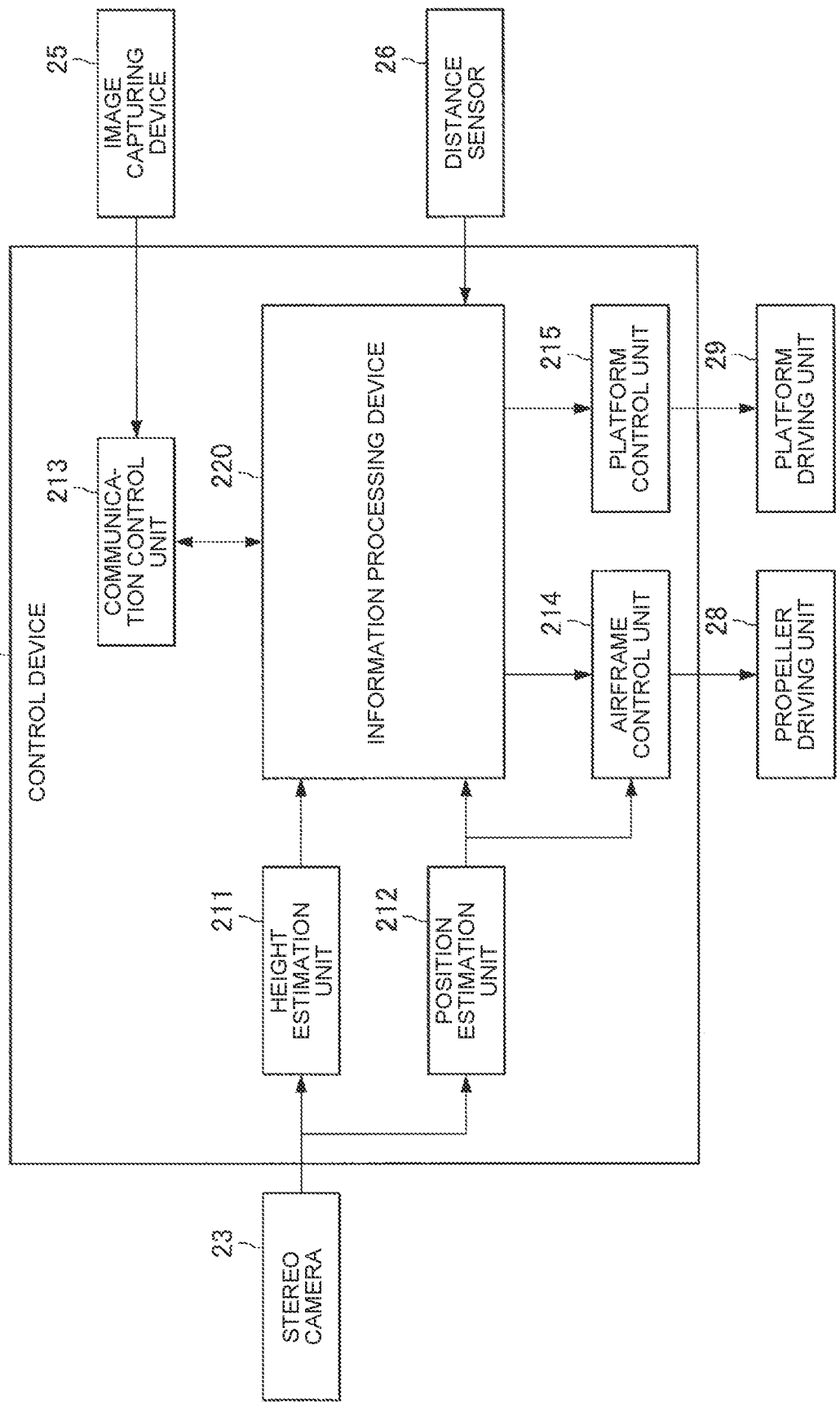
FIG. 5 is a functional block diagram illustrating a configuration of the mobile body according to an embodiment of the present disclosure.

Next, a configuration of the mobile body 20 according to an embodiment of the present disclosure will be described with reference to FIGS. 4 and 5. FIG. 4 is a view schematically illustrating an appearance of the mobile body 20 according to an embodiment of the present disclosure. FIG. 5 is a functional block diagram illustrating a configuration of the mobile body 20 according to an embodiment of the present disclosure.

The mobile body 20 moves (flies) in the air by the operation of the piloting device 10, and in the mobile body 20, the image capturing device 25 mounted on the mobile body 20 captures an image of a landscape or the like. The image capturing device 25 is attached to an airframe 21 via a platform 24. Note that, in the present specification, the image capturing device 25 is also referred to as a second or third image capturing device. The platform 24 includes three movable shafts including a pan shaft, a tilt shaft, and a roll shaft, and can direct the image capturing device 25 in any direction regardless of the posture of the mobile body 20. A control device 27 as described later with reference to FIG. 5 is mounted inside the airframe 21.

A distance measurement sensor 26 is attached to the image capturing device 25. The distance measurement sensor 26 can measure a distance in a direction in which the image capturing device 25 is directed. The distance measurement sensor 26 may include a device capable of measuring various known distances, such as a stereo camera, a depth camera, or a 1D LiDAR. Furthermore, instead of the distance measurement sensor 26, the image capturing device 25 may have a function of measuring various distances (for example, a distance in a depth direction). For example, the image capturing device 25 may include a stereo camera, an RGB-D camera, or the like. It is assumed that a relative positional relationship between the distance measurement sensor 26 and the image capturing device 25 is known by means such as calibration. Therefore, the image capturing device 25 can measure a distance corresponding to an arbitrary pixel of the image capturing device 25.

Note that the distance measurement sensor 26 may function as a second distance acquisition unit. Here, the second distance acquisition unit is a functional unit having a function of acquiring the second distance from the mobile body 20 to the second position based on information detected by various devices provided in the mobile body 20. In the present embodiment, the mobile body 20 is provided with the second distance acquisition unit. Therefore, the second distance is acquired more accurately. As a result, the pilot can control the movement of the mobile body 20 more accurately.

Further, a stereo camera 23 is attached to the mobile body 20. The stereo camera 23 may measure the self-position or the movement amount of the mobile body 20. Instead of the stereo camera 23, the self-position or the movement amount of the mobile body 20 may be measured by a depth camera, a LiDAR, or the like.

Next, the configuration of the control device 27 will be described in more detail with reference to FIG. 5. As illustrated in FIG. 5, the control device 27 includes a height estimation unit 211, a position estimation unit 212, a communication control unit 213, an airframe control unit 214, a platform control unit 215, and an information processing device 220.

The height estimation unit 211 has a function of estimating the above-ground height (the height from the ground) of the mobile body 20. The height estimation unit 211 may estimate the above-ground height by acquiring an image from the stereo camera 23, generating a distance image based on the acquired image, detecting the ground by plane detection or the like, and then calculating a distance from the ground (plane) to the stereo camera 23. The height estimation unit 211 may estimate the above-ground height by using a TOF sensor instead of the stereo camera 23. Furthermore, the height estimation unit 211 may estimate the above-ground height by using a positional relationship between the AR marker installed on the ground and the stereo camera 23, for example. Moreover, the height estimation unit 211 may use an altimeter or the self-position to estimate the above-ground height by using a difference between a height at the time of takeoff of the mobile body 20 and a height at the time of measurement. Note that the height estimation unit 211 may function as the second distance acquisition unit.

The position estimation unit 212 has a function of estimating the self-position of the mobile body 20. Note that the self-position includes not only the position but also the posture. The position estimation unit 212 may acquire an image acquired by the stereo camera 23 and estimate the self-position by performing the SLAM using the image. Furthermore, the position estimation unit 212 may estimate the self-position by using a TOF sensor instead of the stereo camera 23. Furthermore, the position estimation unit 212 may estimate the self-position by using the positional relationship between the installed AR marker and the stereo camera 23.

The communication control unit 213 has a function of controlling communication between the piloting device 10 and the mobile body 20. For example, the communication control unit 213 may control reception of a piloting command from the piloting device 10 or transmission of an image of the image capturing device 25 to the piloting device 10.

The information processing device 220 has a function of generating various parameters for controlling the motion of the airframe 21 or the platform 24 of the mobile body 20. Furthermore, the information processing device 220 has a function of controlling the motion of the airframe 21 or the platform 24 based on the generated parameters. Specifically, the information processing device 220 has a function of controlling a propeller 22 or the platform 24 via the airframe control unit 214 (mobile body control unit) or the platform control unit 215 by using the above-ground height or the self-position estimated by the height estimation unit 211 or the position estimation unit 212 based on the piloting command received by the communication control unit 213. The configuration of the information processing device 220 will be described later with reference to FIG. 6.

The airframe control unit 214 controls the propeller 22 via a propeller driving unit 28 so that the self-position reaches a target position based on the target position generated by the information processing device 220 and the self-position estimated by the position estimation unit 212. As a result, the airframe control unit 214 can control the movement and posture of the mobile body 20 (airframe 21). The control is implemented, for example, by performing a feedback control for a difference between the self-position and the target position using a proportional integral differential (PID) controller. Note that the airframe control unit 214 and the platform control unit 215 as described later may be provided in the information processing device 220.

The platform control unit 215 controls the platform 24 via a platform driving unit 29 so that the image capturing device 25 is directed in a direction instructed from the information processing device 220.

1.3. Configuration of Information Processing Device

Figure 6:
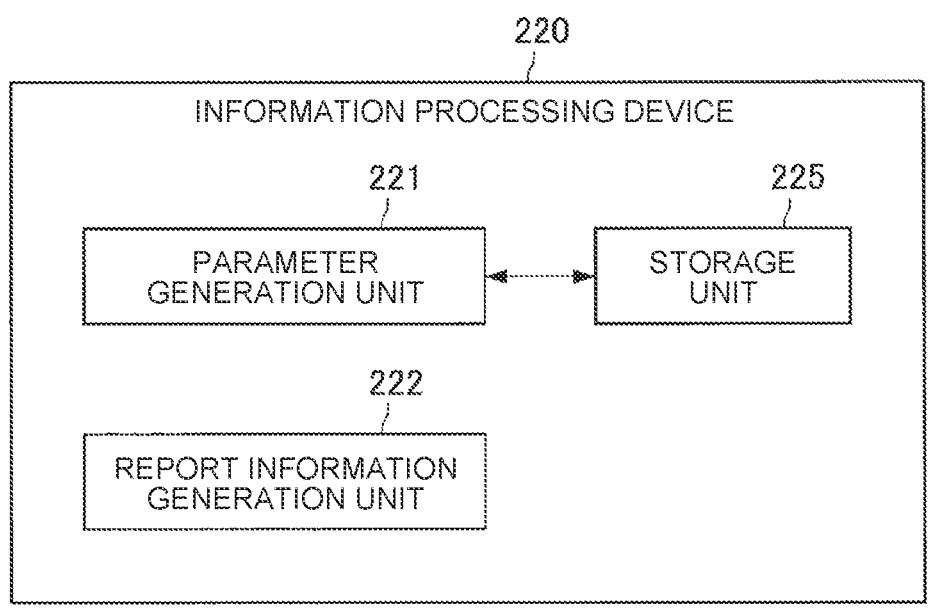
FIG. 6 is a functional block diagram illustrating a configuration of an information processing device according to an embodiment of the present disclosure.

Next, a configuration of the information processing device 220 according to an embodiment of the present disclosure will be described with reference to FIG. 6. FIG. 6 is a functional block diagram illustrating the configuration of the information processing device 220 according to an embodiment of the present disclosure.

The functions of the information processing device 220 are implemented by cooperation of a parameter generation unit 221, a report information generation unit 222, and a storage unit 225 included in the information processing device 220.

The parameter generation unit 221 has a function of generating various parameters for controlling the motion of the mobile body 20 or the platform 24 included in the mobile body 20. For example, the parameter generation unit 221 has a function of generating a movement parameter for controlling the movement of the mobile body 20 based on a ratio between the first distance from the piloting device 10 which is a reference for the movement of the mobile body 20 to the first position and the second distance from the mobile body 20 to the second position, and the movement of the piloting device 10.

The parameter generation unit 221 may also generate the movement amount as the movement parameter by multiplying the ratio between the first distance and the second distance by the movement amount of the piloting device 10. In addition, the parameter generation unit 221 may generate a first posture parameter for causing the mobile body 20 to take a posture according to the posture of the piloting device 10. Further, the parameter generation unit 221 may generate a second posture parameter for causing the platform 24 to take a posture according to the posture of the piloting device 10.

Various parameters generated by the parameter generation unit 221 are transmitted to the communication control unit 213, the airframe control unit 214, or the platform control unit 215. Further, the generated various parameters are stored in the storage unit 225 as necessary.

The report information generation unit 222 has a function of generating various types of report information in the piloting device 10. For example, the report information generation unit 222 generates report information indicating that transition to various flight modes in the mobile body 20 has been completed. The generated report information is transmitted to the communication control unit 213. Note that details of the flight mode will be described later.

The storage unit 225 stores information regarding various parameters generated by the parameter generation unit 221. The storage unit 225 stores information regarding the motion of the piloting device 10, such as the movement amount or posture of the piloting device 10. Furthermore, the storage unit 225 may store various parameters generated by the parameter generation unit 221.

1.4. Coordinate System

Next, a coordinate system used in the following description will be defined with reference to FIGS. 7 and 8. Note that, although FIGS. 7 and 8 are represented two-dimensionally, all coordinate systems used in the following description are assumed to be three-dimensional.

The piloting device 10 and the mobile body 20 have different coordinate systems. These coordinate systems are referred to as a piloting device coordinate system and a mobile body coordinate system, respectively. FIG. 7 is a diagram illustrating the piloting device coordinate system. FIG. 8 is a diagram illustrating the mobile body coordinate system.

Figure 7:
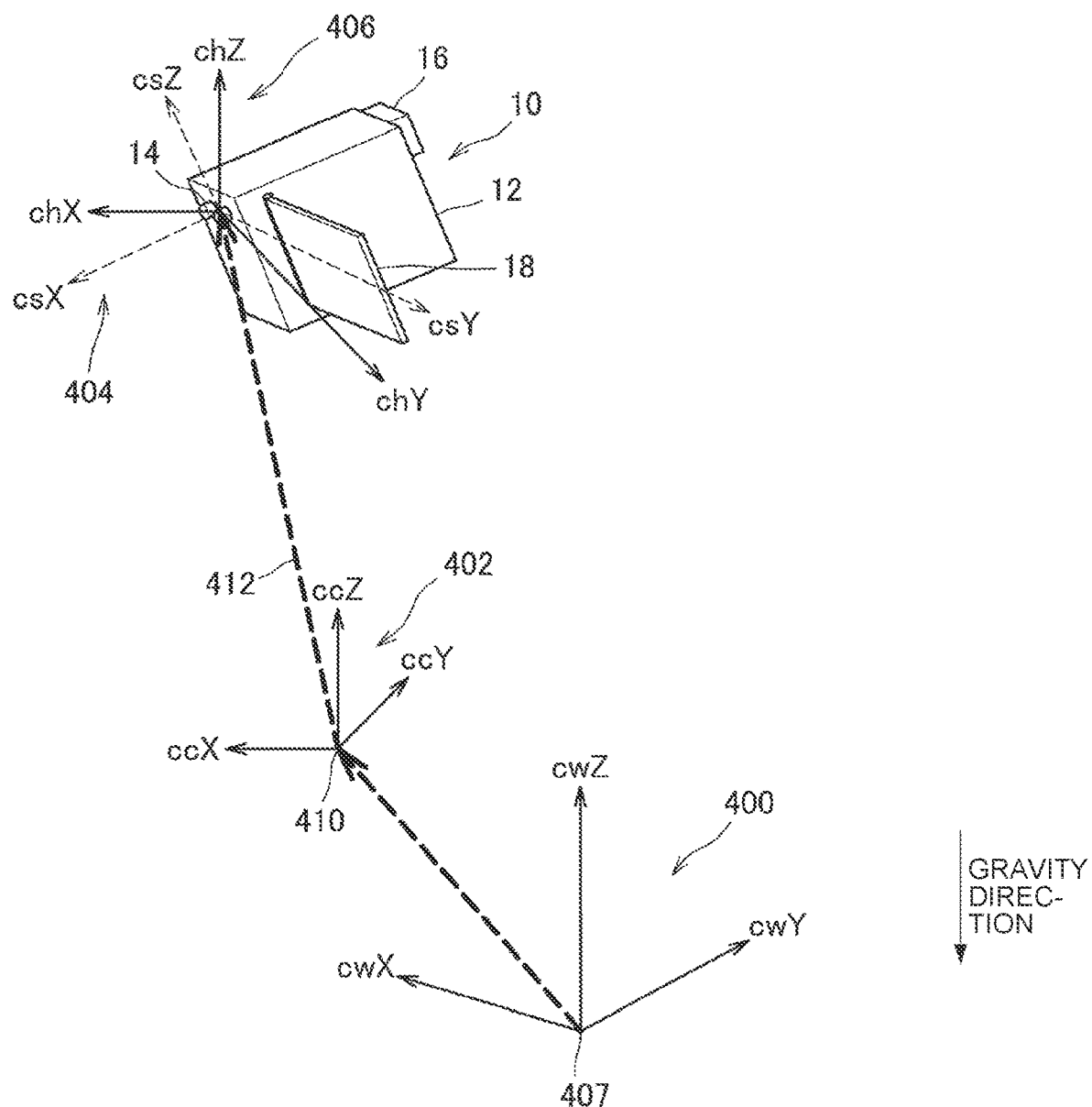
FIG. 7 is a diagram illustrating a piloting device coordinate system.
Figure 8:
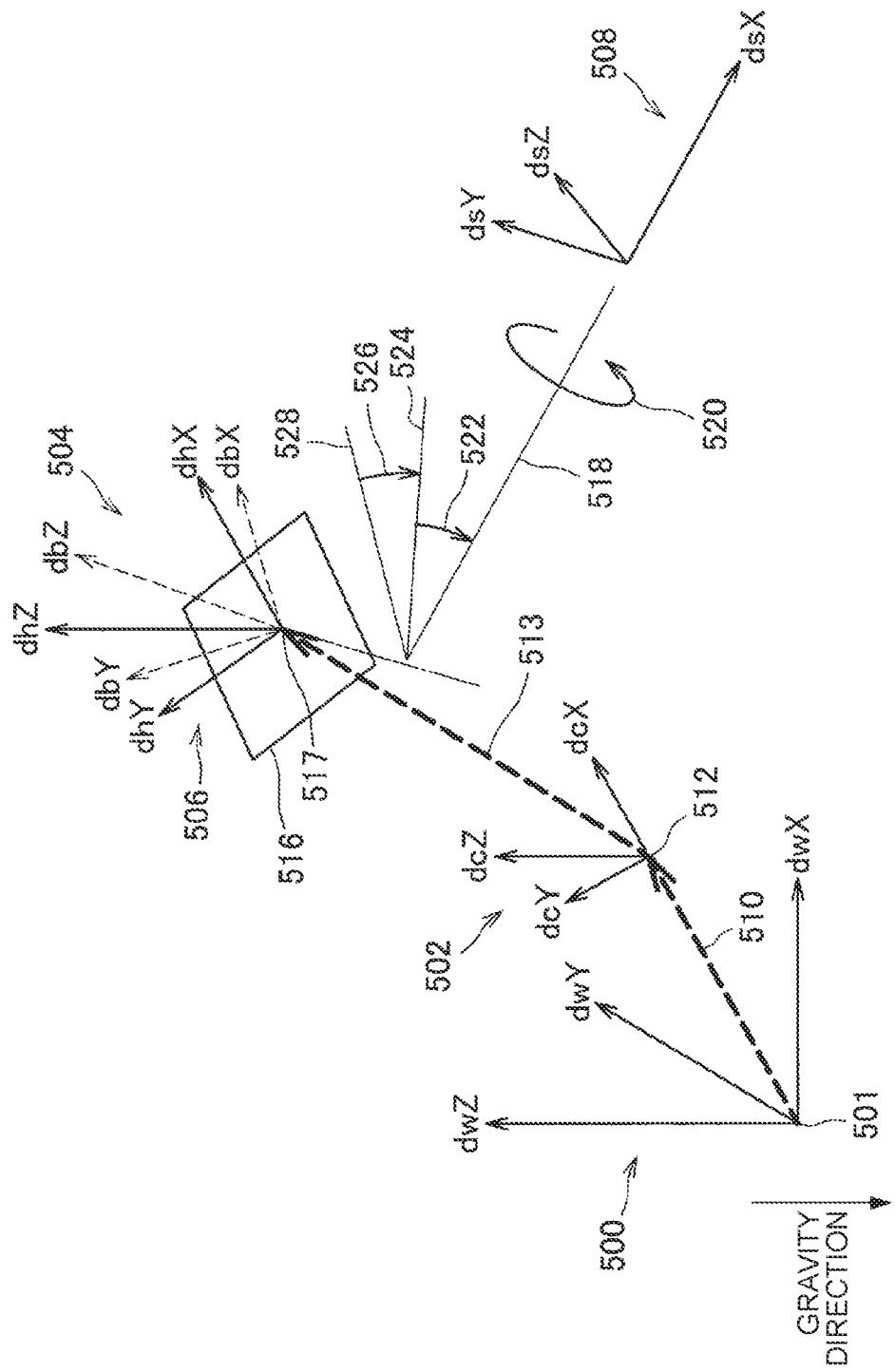
FIG. 8 is a diagram illustrating a mobile body coordinate system.

As illustrated in FIG. 7, the piloting device coordinate system includes the following four coordinate systems.
(1) A world coordinate system (CW) in which an origin 407 is an arbitrary position in the real world
(2) A piloting coordinate system (CC) in which an origin 410 (piloting origin) is an arbitrary position on the world coordinate system
(3) A piloting device coordinate system (CS), which is a coordinate system fixed to the piloting device 10
(4) A horizontal piloting device coordinate system (CH), which is a coordinate system that moves in conjunction with the position of the piloting device 10

Coordinate axes 400 of the world coordinate system (CW) include a cwX axis, a cwY axis, and a cwZ axis orthogonal to each other. Further, coordinate axes 402 of the piloting coordinate system (CC) include a ccX axis, a ccY axis, and a ccZ axis orthogonal to each other. Further, coordinate axes 404 of the piloting device coordinate system (CS) include a csX axis, a csY axis, and a csZ axis orthogonal to each other. Further, coordinate axes 406 of the horizontal piloting device coordinate system (CH) include a chX axis, a chY axis, and a chZ axis orthogonal to each other.

In an embodiment of the present disclosure, the origin of the piloting device coordinate system (CS) and the origin of the horizontal piloting device coordinate system (CH) are fixed to the stereo camera 14 of the piloting device 10 and are away from the origin 410 of the piloting coordinate system (CC) (also referred to as "piloting origin") by a relative movement amount 412 of the piloting device 10. Here, the relative movement amount means the amount of movement from the piloting origin. In the present specification, the relative movement amount is also simply referred to as "movement amount".

On the other hand, the mobile body coordinate system includes the following five coordinate systems as illustrated in FIG. 8.
(1) A world coordinate system (DW) in which an origin 501 is an arbitrary position in the real world
(2) A piloting coordinate system (DC) in which an origin (piloting origin 512) is an arbitrary position on the world coordinate system
(3) An airframe coordinate system (DB) which is a coordinate system fixed to the airframe 21 of the mobile body 20
(4) A horizontal airframe coordinate system (DH) which is a coordinate system that moves in conjunction with the position of the airframe 21 of the mobile body 20

(5) An image capturing device coordinate system (DS) fixed to the image capturing device 25 mounted on the platform 24

Coordinate axes 500 of the world coordinate system (DW) include a dwX axis, a dwY axis, and a dwZ axis orthogonal to each other. Further, coordinate axes 502 of the piloting coordinate system (DC) include a dcX axis, a dcY axis, and a dcZ axis orthogonal to each other. Further, coordinate axes 504 of the airframe coordinate system (DB) include a dbX axis, a dbY axis, and a dbZ axis orthogonal to each other. Further, coordinate axes 506 of the horizontal airframe coordinate system (DH) include a dhX axis, a dhY axis, and a dhZ axis orthogonal to each other. Further, coordinate axes 508 of the image capturing device coordinate system (DS) include a dsX axis, a dsY axis, and a dsZ axis orthogonal to each other. Note that, in FIG. 8, a schematic diagram 516 illustrating a part of the airframe 21 is indicated by a quadrangle.

An origin 517 of the airframe coordinate system (DB) and the horizontal airframe coordinate system (DH) is away from the piloting origin 512 of the piloting coordinate system (DC) by a relative movement amount 513 of the mobile body 20.

Furthermore, in the image capturing device coordinate system (DS), a positive direction of the dsX axis is an optical axis direction of the image capturing device 25. A roll shaft 518 is aligned with the dsX axis, and a roll angle 520 is an angle of rotation around the roll shaft 518. A tilt shaft 524 is a shaft rotated by a tilt angle 522 with respect to the roll shaft 518. Furthermore, a pan shaft 528 is a shaft rotated by a pan angle 526 with respect to the tilt shaft 524.

The coordinate system of the self-position of the piloting device 10 estimated by the position estimation unit 132 is the world coordinate system (CW) of the pilot device coordinate system. On the other hand, the coordinate system of the self-position of the mobile body 20 estimated by the position estimation unit 212 is the world coordinate system (DW) of the mobile body coordinate system.

In the world coordinate system (CW) and the piloting coordinate system (CC) of the piloting device coordinate system, and the world coordinate system (DW) and the piloting coordinate system (DC) of the mobile body coordinate system, a negative direction of a Z axis is a gravity direction.

The origin of the horizontal piloting device coordinate system (CH) in the piloting device coordinate system is the same as that of the piloting device coordinate system (CS), and the negative direction of the Z axis is fixed to the gravity direction. In addition, the horizontal piloting device coordinate system (CH) is a coordinate system reflecting only a rotation component around the Z axis in the piloting coordinate system (CC) among rotation components in the world coordinate system (CW) of the piloting device coordinate system (CS).

Furthermore, the origin of the horizontal airframe coordinate system (DH) in the mobile body coordinate system is the same as that of the airframe coordinate system (DB), and the negative direction of the Z axis is fixed to the gravity direction. The horizontal airframe coordinate system (DH) is a coordinate system reflecting only a rotation component around the Z axis in the piloting coordinate system (DC) among rotation components in the world coordinate system (DW) of the airframe coordinate system (DB).

In addition, the shaft configuration (the pan shaft, the tilt shaft, and the roll shaft) of the platform 24 are configured so that the airframe 21, the pan shaft, the tilt shaft, the roll shaft, and the image capturing device 25 are connected in this order from the airframe 21 of the mobile body 20. Therefore, a portion of the pan shaft connected to the airframe 21 is fixed in the airframe coordinate system (DB).

2. Processing Example

A processing example according to an embodiment of the present disclosure using the piloting device 10 and the mobile body 20 described above will be described.

Flight modes of the mobile body 20 according to an embodiment of the present disclosure include a manual piloting mode, a waypoint flight mode, and a direct piloting mode. The mobile body 20 performs processing according to these flight modes.

The manual piloting mode is a mode in which the pilot pilots the mobile body 20 by instructing a traveling direction, posture, or the like of the mobile body 20 using the input/output unit 18 of the piloting device 10. In addition, a piloting stick (not illustrated) may be provided in the piloting device 10, and the pilot may pilot the mobile body 20 using the stick.

In the waypoint flight mode, as a waypoint setting screen, a map may be displayed on the input/output unit 18 of the piloting device 10, and the pilot may operate the screen to set a waypoint. Here, the waypoint means a specific position on a track on which the mobile body 20 flies. In addition, the waypoint may be set in a manner in which a map is displayed on a screen of a smartphone or the like communicable with the piloting device 10 or the mobile body 20 and the pilot operates the smartphone or the like. Furthermore, the waypoint may be set in the mobile body 20 in a manner in which the pilot makes the mobile body 20 fly in the manual piloting mode, and operates the input/output unit 18 of the piloting device 10 when the mobile body 20 is present at an arbitrary point. As a result, the mobile body 20 automatically flies so as to go around the waypoint.

The direct piloting mode is a flight mode used in the present embodiment. In the direct piloting mode, when the pilot carries and moves the piloting device 10, the mobile body 20 moves according to the movement amount of the piloting device 10.

Figure 9:
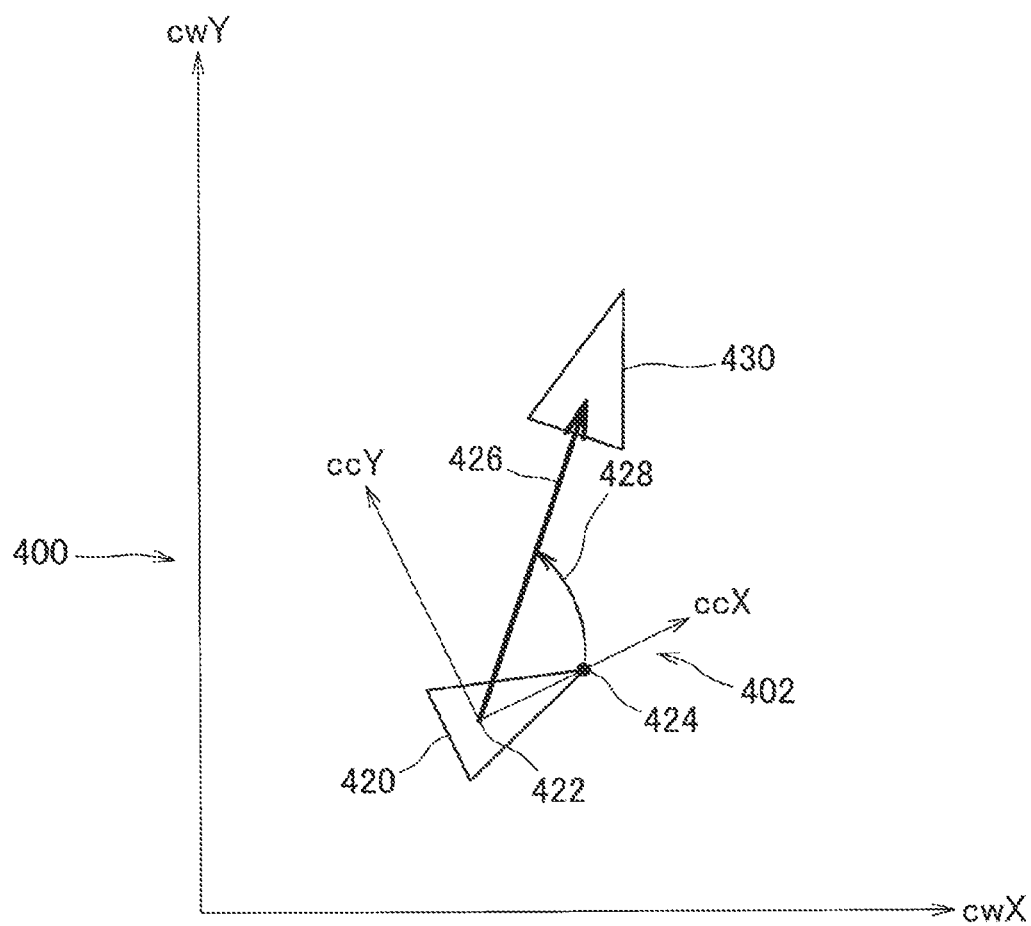
FIG. 9 is a schematic overhead view of the piloting device.
Figure 10:
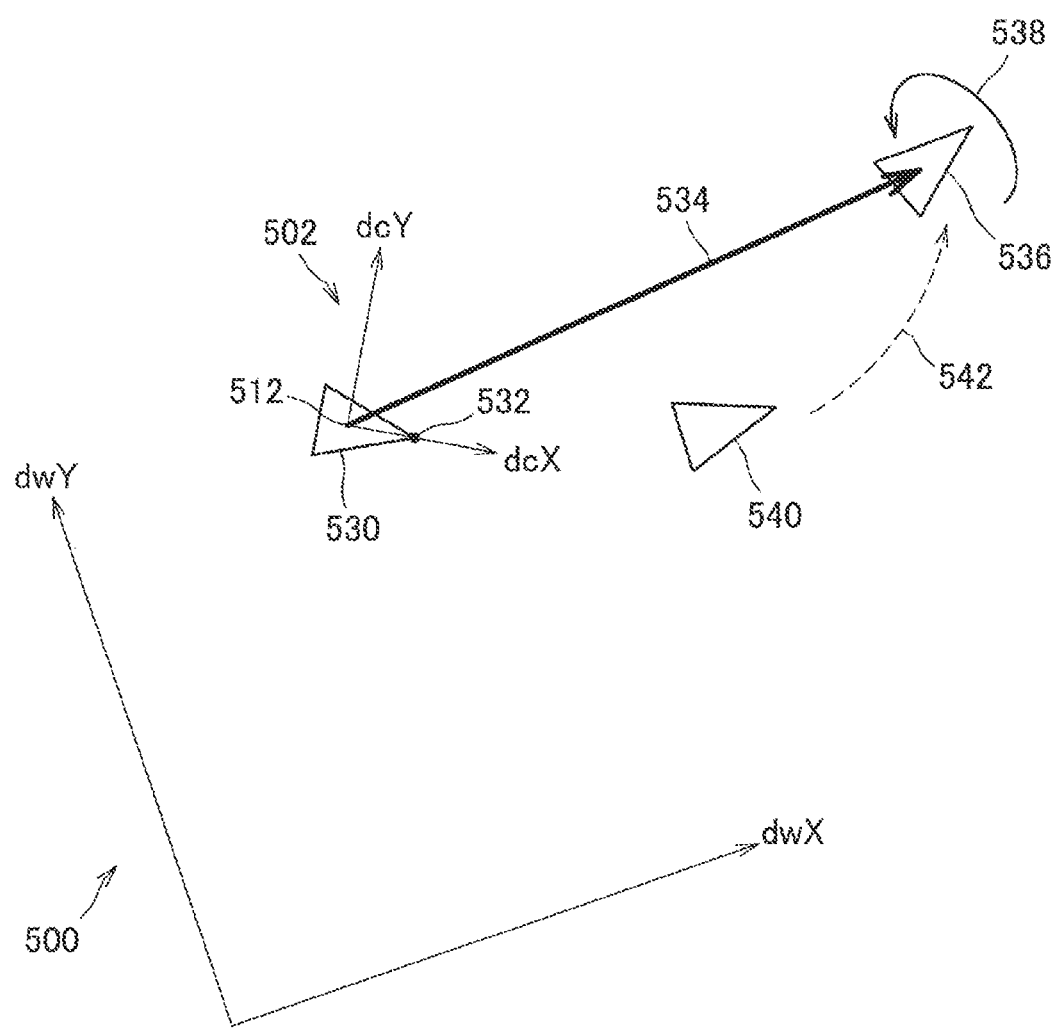
FIG. 10 is a schematic overhead view of the mobile body.

Images of the operations of the piloting device 10 and the mobile body 20 in the direct piloting mode will be described with reference to FIGS. 9 and 10. FIG. 9 is a schematic overhead view of the piloting device 10. FIG. 10 is a schematic overhead view of the mobile body 20.

FIG. 9 illustrates the coordinate axes 400 of the world coordinate system (CW) and the coordinate axes 402 of the piloting coordinate system (CC) in the piloting device coordinate system. In FIG. 9, piloting devices are schematically indicated by isosceles triangles, and a piloting device 420 positioned at a piloting origin 422 and a piloting device 430 positioned at its self-position at a certain moment are illustrated. Note that, in FIG. 9, a direction from the center of gravity (the piloting origin 422 in the piloting device 420) of the isosceles triangle toward a vertex 424 is defined as the front in a piloting direction. Here, it is assumed that the center of gravity is the origin in the piloting coordinate system (CC). In FIG. 9, the piloting device positioned at the piloting origin 422 moves by a movement amount 426 indicated by a straight arrow and rotates by an arc arrow 428, such that the current position and posture of the piloting device 430 are realized.

FIG. 10 illustrates the coordinate axes 500 of the world coordinate system (DW) and the coordinate axes 502 of the piloting coordinate system (DC) in the mobile body coordinate system. In FIG. 10, mobile bodies are schematically indicated by isosceles triangles, and a mobile body 530 positioned at the piloting origin 512, a mobile body 540 at the current self-position, and a mobile body 538 whose position and posture reflecting the piloting command from the piloting device are realized are illustrated.

In the present embodiment, the piloting command is transmitted from the piloting device to the mobile body. The piloting command includes a command for controlling the position and posture of the mobile body. In the present embodiment, a control command is transmitted to the mobile body so that the mobile body moves from the piloting origin 512 by a relative movement amount 534 obtained by multiplying the movement amount 426 of the piloting device by the ratio between the first distance and the second distance. In addition, the control command is transmitted to the mobile body so that the posture of the mobile body changes by an amount corresponding to a change of the posture of the piloting device from that in a state of being positioned at the piloting origin. The mobile body performs a feedback control according to the control command so that the position of the mobile body moves from the piloting origin 512 by the relative movement amount 534, and the posture of the mobile body converges to the posture based on the control command.

As a result, the mobile body 20 moves while increasing the movement amount around the piloting origin while maintaining a similar shape in a state where relative directions are synchronized between the mobile body 20 and the pilot, based on the movement of the piloting device 10. With this mechanism, the pilot can control the airframe 21 or the platform 24 so that the image capturing device 25 is framed as intended by the pilot only by moving the piloting device 10 as if a miniature in front of the pilot is captured by a camera. As compared with a case where the airframe 21 and the platform 24 are individually and manually controlled using a proportional transmitter (also referred to as "radio controller"), the pilot can easily and intuitively frame the image capturing device 25 mounted on the mobile body 20.

A method for obtaining a ratio (movement ratio: also referred to as Sm) used when the movement amount of the piloting device 10 is reflected in the movement amount of the mobile body 20 is not particularly limited. Hereinafter, two methods including a method using the above-ground height (first processing example) and a method using a distance to the gaze point (second processing example) will be described.

2.1. First Processing Example

In the first processing example, the movement ratio is set using the above-ground height.

In the first processing example, first, the mobile body 20 flies in the manual piloting mode or the waypoint flight mode from takeoff until the mobile body 20 reaches a point above an area where image capturing is performed. When the mobile body 20 reaches the point above the area where image capturing is performed, the pilot operates the input/output unit 18 of the piloting device 10 to make the mobile body 20 be temporarily in a hovering state (a state where the speed is 0) and then changes the flight mode to the direct piloting mode.

Figure 11:
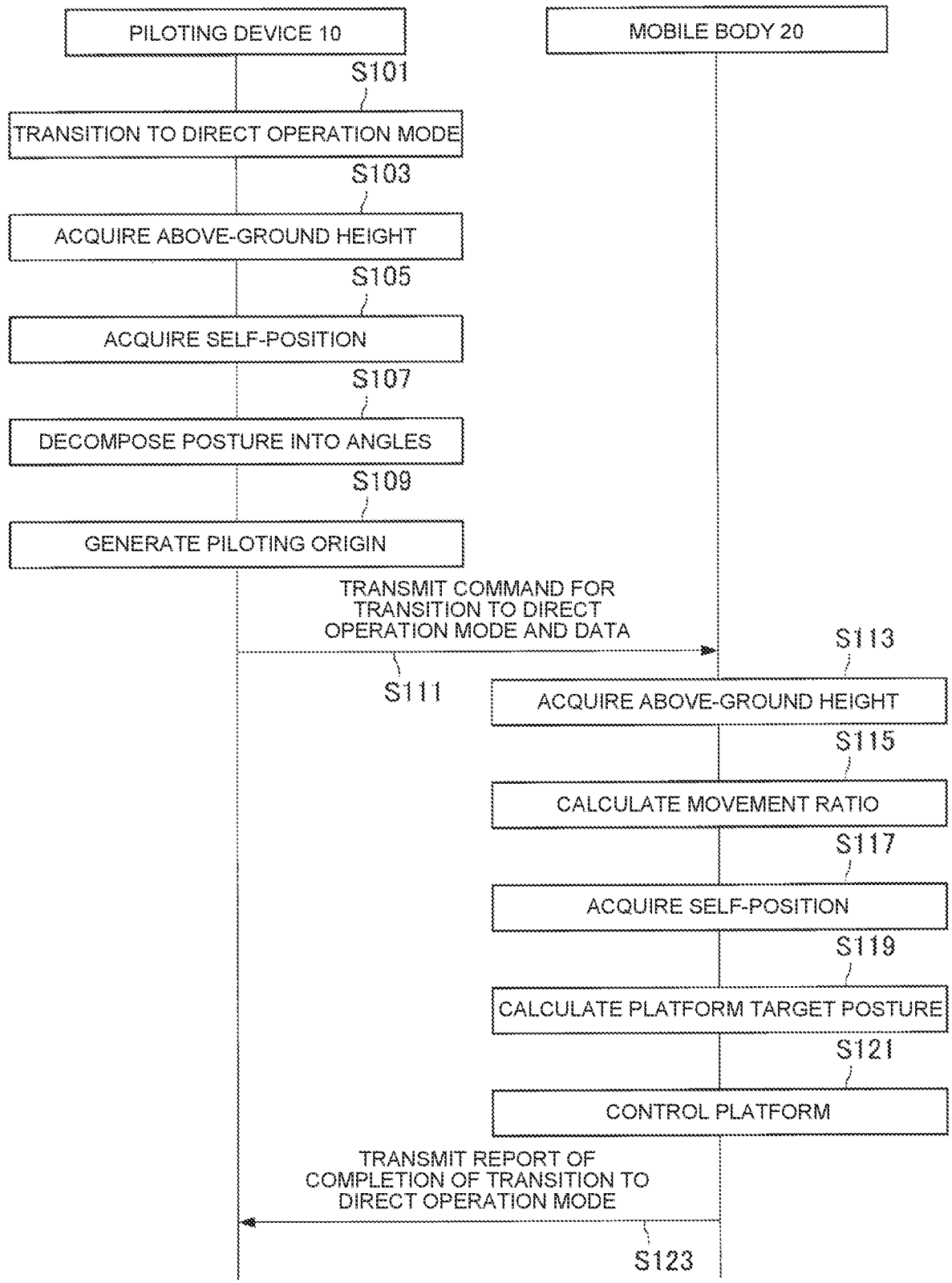
FIG. 11 is a flowchart illustrating processing for transition of a flight mode of the mobile body to a direct piloting mode.

Hereinafter, the following processing in the piloting device 10 and the mobile body 20 will be described with reference to FIG. 11. Specifically, the transition of the flight mode to the direct piloting mode will be described in detail. FIG. 11 is a flowchart illustrating processing for transition of the flight mode of the mobile body 20 to the direct piloting mode. Hereinafter, a processing example will be described with reference to the flowchart illustrated in FIG. 11.

First, a flow of the processing in the piloting device 10 will be described.

First, the piloting device 10 transitions to the direct operation mode (Step S101). Specifically, when the pilot performs an operation for transition of the flight mode to the direct piloting mode by using the UI of the input/output unit 18, an operation command for the transition to the direct piloting mode is input to the command generation unit 136 via the UI control unit 138.

When the command generation unit 136 receives the operation command for the transition to the direct piloting mode, the command generation unit 136 acquires the above-ground height (Hc) from the height estimation unit 131 (Step S103).

Next, the command generation unit 136 acquires the current self-position of the piloting device 10 from the position estimation unit 132 (Step S105). The command generation unit 136 decomposes the posture of the piloting device 10 into a pan angle ($^{cw}\theta_p$), a tilt angle ($^{cw}\theta_t$), and a roll angle ($^{cw}\theta_r$) based on the acquired self-position (Step S107). Note that, in the present specification, a subscript on the upper left side of each angle θ indicates the type of the coordinate system representing the angle θ. Further, a method of decomposing the posture of the self-position into the pan angle, the tilt angle, and the roll angle will be described later.

Next, the command generation unit 136 generates the piloting origin and stores the generated piloting origin in the storage unit 137 (Step S109). The piloting origin of the piloting device 10 represents a relationship between the world coordinate system (CW) and the piloting coordinate system (CC) of the piloting device coordinate system, and includes a position ($^{cw}X_{co}$, $^{cw}Y_{co}$, and $^{cw}Z_{co}$) in the world coordinate system (CW) and a posture ($^{cw}\theta_{zco}$) in a Z-axis rotation direction. The piloting origin is generated using the following two values.

(1) Position ($^{cw}X_{co}$, $^{cw}Y_{co}$, and $^{cw}Z_{co}$): a translation component of the self-position of the piloting device 10
(2) Posture in Z-axis rotation direction ($^{cw}\theta_{zco}$): the pan angle ($^{cw}\theta_p$) of the posture of the self-position of the piloting device 10

Next, the command generation unit 136 transmits a command for the transition to the direct piloting mode to the mobile body 20 via the communication control unit 134 together with the following two data (Step S111).

(1) The above-ground height (Hc) of the piloting device 10
(2) The current posture of the piloting device 10 (the tilt angle ($^{cw}\theta_t$), and the roll angle ($^{cw}\theta_r$))

Once the command for the transition to the direct piloting mode is transmitted, the piloting device 10 waits for a report of completion of the transition to the direct piloting mode of the mobile body 20. Through the above processing, the transition of the piloting device 10 to the direct piloting mode is completed.

Next, a flow of the processing in the mobile body 20 will be described. Once the command for the transition to the direct piloting mode transmitted by the piloting device 10 is acquired via the communication control unit 213, the information processing device 220 performs the following processing.

First, the information processing device 220 acquires the above-ground height estimated by the height estimation unit 211 (Step S113).

Next, the information processing device 220 calculates the movement ratio (Sm) (Step S115). The movement ratio (Sm) is a ratio for reflecting the movement amount of the piloting device 10 in the movement amount of the airframe 21. Specifically, the parameter generation unit 221 calculates the movement ratio based on the following Equation (1) by using the above-ground height (Hc) of the piloting device 10 acquired from the piloting device 10 and the above-ground height (Hd) of the airframe 21 estimated by the height estimation unit 211 included in the mobile body 20.

$$\text{Movement ratio } (Sm) = \text{Above-ground height } (Hd) \text{ of aircraft} / \text{Above-ground height } (Hc) \text{ of piloting device} \quad (1)$$

The calculated movement ratio (Sm) is stored in the storage unit 225 of the information processing device 220.

Next, the information processing device 220 acquires the current self-position of the airframe 21 from the position estimation unit 212 (Step S117). The acquired self-position is stored in the storage unit 225 as the piloting origin. The piloting origin represents a relationship between the world coordinate system (DW) and the piloting coordinate system (DC) of the mobile body coordinate system, and includes a position ($^{dw}X_{co}$, $^{dw}Y_{co}$, and $^{dw}Z_{co}$) in the world coordinate system (DW) and a posture ($^{dw}\theta_{zco}$) in the Z-axis rotation direction. The parameter generation unit 221 generates the piloting origin by using the following values.

(1) Position ($^{dw}X_{co}$, $^{dw}Y_{co}$, and $^{dw}\theta_{zco}$): translational components of the self-position of the airframe 21

(2) Posture in Z-axis rotation direction ($^{dw}\theta_{zco}$): the pan angle ($^{dw}\theta_p$) of the posture of the self-position of the airframe 21

A method of decomposing the self-position into the pan angle, the tilt angle, and the roll angle will be described later.

Next, the mobile body 20 calculates a target posture of the platform 24 (Step S119). Specifically, the parameter generation unit 221 generates a second parameter for making the posture of the image capturing device 25 be the same as the posture of the piloting device 10. More specifically, the parameter generation unit 221 calculates a platform target position as the second posture parameter by using the posture component of the self-position acquired by the position estimation unit 212 and the posture ($^{cw}\theta_t$ and $^{cw}\theta_r$) of the piloting device 10 received from the piloting device 10. A method of calculating the second posture parameter will be described later. Next, the mobile body 20 controls the platform 24 via the platform control unit 215 so that the posture of the image capturing device 25 becomes the same as the posture of the piloting device 10 (Step S121).

Next, the mobile body 20 transmits the report of completion of the transition to the direct piloting mode to the piloting device 10 via the communication control unit 213 (Step S123).

Through the above processing, the transition of the mobile body 20 to the direct piloting mode is completed. When both the piloting device 10 and the mobile body 20 complete the transition to the direct piloting mode, the posture of the piloting device 10 and the posture of the image capturing device 25 mounted on the mobile body 20 are synchronized. This enables the piloting device 10 to pilot the mobile body 20 in the direct piloting mode.

Note that the above processing is based on the premise that the negative direction of the Z axis in the world coordinate system (CW) or the like is aligned with the gravity direction in the piloting device coordinate system. However, in a case where a sensor capable of estimating the gravity direction, such as an inertial measurement unit (IMU), is not provided in the piloting device 10, the postures of the piloting device 10 and the image capturing device 25 mounted on the mobile body 20 cannot become the same as each other by the above method. In such a case, the posture of the piloting device 10 and the posture of the image capturing device 25 mounted on the mobile body 20 may be manually adjusted to be the same as each other. Here, an example of a method of manually adjusting the postures to be the same as each other will be described.

A posture that is easy for the pilot to face, such as a horizontal direction, is predetermined as the posture when adjusting the posture of the piloting device 10 and the posture of the image capturing device 25 of the mobile body 20 to be the same as each other.

In the piloting device 10, when an operation for the transition to the direct piloting mode is performed (for example, when the processing of Step S101 is performed), an instruction to cause the piloting device 10 take the above-described predetermined posture is displayed on the UI of the input/output unit 18 or the like before performing a series of processing (for example, the processing of Steps S103 to S109). The pilot operates, for example, a button displayed on the input/output unit 18 after changing the orientation of the piloting device 10 so as to take the instructed posture. Thereafter, the processing at the time of the transition to the direct piloting mode (for example, the processing of Steps S103 to S109) is similarly performed.

At the time of calculating the platform target position (Step S119), the mobile body 20 performs processing (for example, the processing of Steps S113 to S123) similar to the above description by using the predetermined posture instead of the posture of the piloting device 10 (assuming that the piloting device 10 is in the predetermined posture).

Also in the above method, it is possible to synchronize the posture of the piloting device 10 and the posture of the image capturing device 25 mounted on the mobile body 20.

Figure 12:
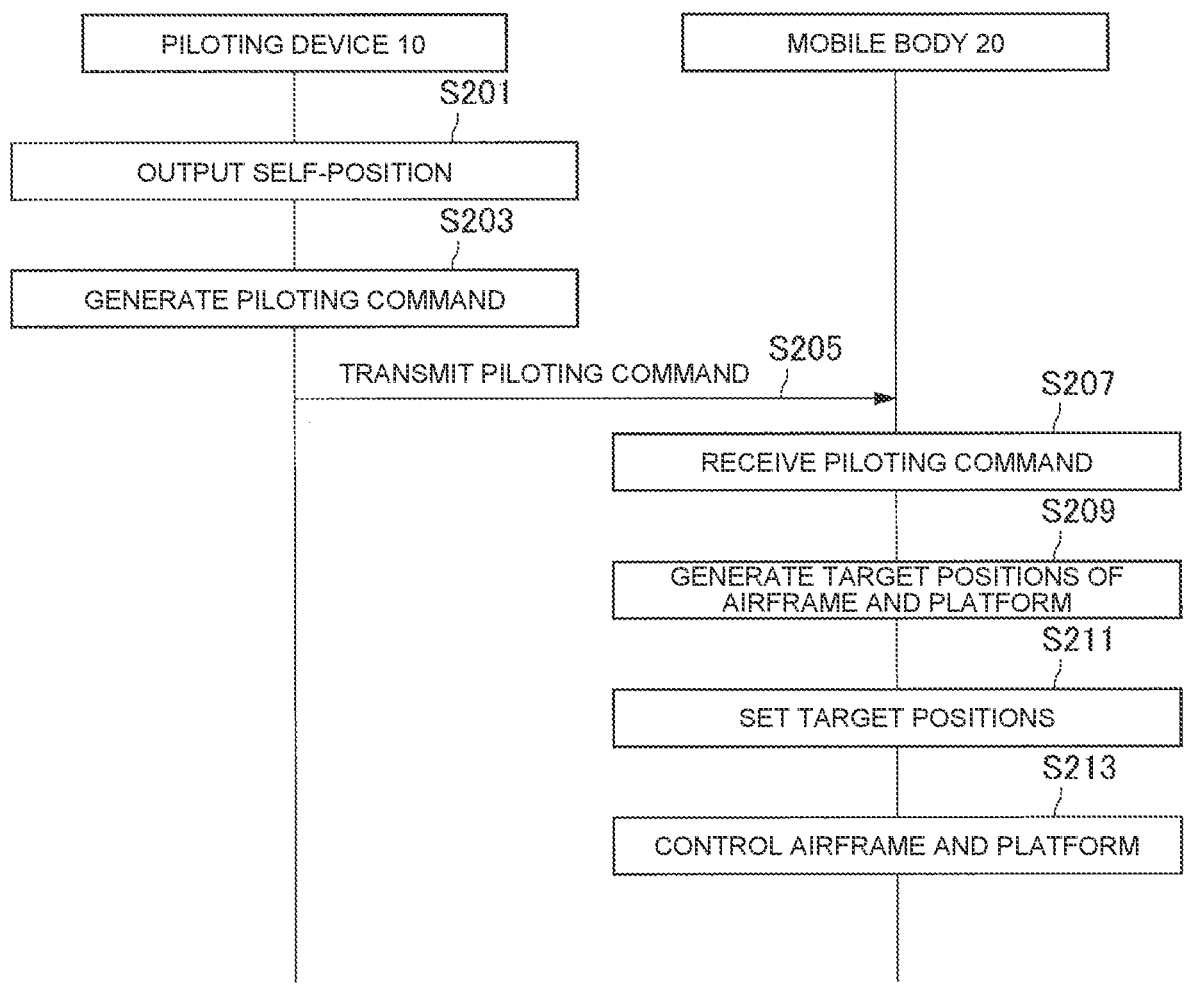
FIG. 12 is a flowchart illustrating processing in the piloting device and the mobile body in the direct piloting mode.

Next, the processing in the piloting device 10 and the mobile body 20 in the direct piloting mode will be described in detail with reference to FIG. 12. FIG. 12 is a flowchart illustrating processing in the piloting device 10 and the mobile body 20 in the direct piloting mode.

First, the processing in the piloting device 10 will be described.

First, the piloting device 10 outputs the self-position thereof (Step S201). More specifically, the position estimation unit 132 estimates the self-position at an interval at an output rate of a sensor used to estimate the self-position, for example, at an interval of 60 frames per second (fps) in a case of the stereo camera 14, and outputs the self-position to the command processing unit 135.

Next, once the self-position is acquired from the position estimation unit 132, the command processing unit 135 generates the piloting command (Step S203). More specifically, the command generation unit 136 calculates the piloting command based on the relative movement amount of the piloting device 10 from the piloting origin stored in the storage unit 137 at the time of the transition to the direct piloting mode (specifically, Step S109).

The piloting command includes the following three pieces of information.

(1) The relative movement amount ($^{cc}X_{ho}$, $^{cc}Y_{ho}$, and $^{cc}Z_{ho}$) from the piloting origin (2) The relative movement amount ($^{cc}\theta_{zho}$) around the Z axis from the piloting origin (3) The tilt angle and the roll angle (cw$\theta_t$ and $^{cc}\theta_r$) of the current self-position Note that the relative movement amount indicates the relationship between the piloting coordinate system (CC) and the horizontal airframe coordinate system (CH). Further, the tilt angle and the roll angle ($^{cw}\theta_t$ and $^{cw}\theta_r$) represent the relationship between the horizontal piloting device coordinate system (CH) and the piloting device coordinate system (CS).

The command generation unit 136 generates the piloting command based on the following Equations (2) to (11) on the basis of the piloting origin stored in the storage unit 137 and the self-position acquired by the position estimation unit 132 of the piloting device 10. Note that values obtained by decomposing the rotation component at the self-position of the piloting device 10 into the pan angle, the tilt angle, and the roll angle (a calculation method will be described later) are $^{cw}\theta_p$, $^{cw}\theta_t$, and $^{cw}\theta_r$. Hereinafter, $R_x$ represents a rotation component (hereinafter, also referred to as "rotation matrix"), $P_x$ represents a translation component, and $T_x$ represents a homogeneous transformation matrix.

At the current self-position of the piloting device 10, the translation component and the posture around the Z axis are expressed by the following Equations (2) to (5).

$$^{cw}\theta_z = {}^{cw}\theta_p \quad (2)$$

$$^{cw}R_{\theta_z} = \begin{bmatrix} \cos^{cw}\theta_z & -\sin^{cw}\theta_z & 0 \\ \sin^{cw}\theta_z & \cos^{cw}\theta_z & 0 \\ 0 & 0 & 1 \end{bmatrix} \quad (3)$$

$$^{cw}P = \begin{bmatrix} ^{cw}X \\ ^{cw}Y \\ ^{cw}Z \end{bmatrix} \quad (4)$$

$$^{cw}T = \begin{bmatrix} ^{cw}R_{\theta_z} & ^{cw}P \\ 0 & 1 \end{bmatrix} \quad (5)$$

Similarly to Equations (3) to (5), the piloting origin is expressed by the following Equations (6) to (8).

$$^{cw}R_{\theta_{zco}} = \begin{bmatrix} \cos^{cw}\theta_{zco} & -\sin^{cw}\theta_{zco} & 0 \\ \sin^{cw}\theta_{zco} & \cos^{cw}\theta_{zco} & 0 \\ 0 & 0 & 1 \end{bmatrix} \quad (6)$$

$$^{cw}P_{co} = \begin{bmatrix} ^{cw}X_{co} \\ ^{cw}Y_{co} \\ ^{cw}Z_{co} \end{bmatrix} \quad (7)$$

$$^{cw}T_{co} = \begin{bmatrix} ^{cw}R_{\theta_{zco}} & ^{cw}P_{co} \\ 0 & 1 \end{bmatrix} \quad (8)$$

The relative movement amount of the piloting device 10 is expressed by the following Equations (9) and (10). Note that $^{cc}R$ represents a rotation component in the relative movement amount of the piloting device 10.

$$^{cc}P = \begin{bmatrix} ^{cc}X_{ho} \\ ^{cc}Y_{ho} \\ ^{cc}Z_{ho} \end{bmatrix} \quad (9)$$

$$^{cc}T = \begin{bmatrix} ^{cc}R & ^{cc}P \\ 0 & 1 \end{bmatrix} \quad (10)$$

The command generation unit 136 calculates the relative movement amount of the piloting device 10 based on the following Equation (11) by using the piloting origin and the current self-position.

$$^{cc}T = {}^{cw}T_{co}^{-1}{}^{cw}T = \begin{bmatrix} ^{cw}R_{\theta_{zco}}^T & -{}^{cw}R_{\theta_{zco}}^T{}^{cw}P_{co} \\ 0 & 1 \end{bmatrix} {}^{cw}T \quad (11)$$

The command generation unit 136 extracts necessary components from $^{cc}T$ expressed by Equation (11) to acquire $^{cc}P$ and $^{cc}R$. Further, the command generation unit 136 acquires $^{cc}X_{ho}$, $^{cc}Y_{ho}$, and $^{cc}Z_{ho}$ from $^{cc}P$. Further, the command generation unit 136 decomposes $^{cc}R$ into the pan angle, the tilt angle, and the roll angle to calculate the pan angle $^{cc}\theta_{zho}$. Note that a method in which the command generation unit 136 decomposes $^{cc}R$ to calculate the angle $^{cc}\theta_{zho}$ of the pan shaft will be described later.

Next, the piloting device 10 transmits the piloting command to the mobile body 20 (Step S205). More specifically, the command generation unit 136 transmits the piloting command to the mobile body 20 via the communication control unit 134. Note that the processing of Steps S201 to S205 is performed every time the position estimation unit 132 of the piloting device 10 outputs the self-position.

Next, the processing in the mobile body 20 will be described.

The mobile body 20 receives, by the communication control unit 213, the piloting command calculated by the piloting device 10 (Step S207). The received piloting command is transmitted to the information processing device 220.

Next, the information processing device 220 generates an airframe target position and the platform target position based on the transmitted piloting command (Step S209). More specifically, the parameter generation unit 221 generates various parameters related to the airframe target position and the platform target position, and transmits the generated various parameters to the airframe control unit 214 and the platform control unit 215.

In a case where the mobile body 20 is a flying object with a quad rotor, forward, backward, leftward, and rightward movements of the airframe 21 are controlled by the posture of the airframe 21. Therefore, the position and posture of the image capturing device 25 expressed by piloting device 10 cannot be realized only by the movement of the airframe 21. Therefore, a degree of freedom other than rotation around axes in a translation direction and the gravity direction is realized by the platform 24. Furthermore, a change of the posture of the mobile body 20 due to a motion state of the mobile body 20 or a disturbance such as wind is also absorbed by the platform 24.

A specific method of calculating the airframe target position will be described. The airframe target position ($^{dw}X_{ref}$, $^{dw}Y_{ref}$, $^{dw}Z_{ref}$, and $^{dw}\theta_{zref}$) is a value representing a difference between the world coordinate system (DW) and the horizontal airframe coordinate system (DH). in a case of the airframe target position, since the gravity direction is aligned with the dwZ axis and the dhZ axis, the degree of freedom is expressed by four values including three degrees of freedom in translation ($^{dw}X_{ref}$, $^{dw}Y_{ref}$, and $^{dw}Z_{ref}$) and rotation around the Z axis ($^{dw}\theta_{zref}$).

The parameter generation unit 221 calculates the airframe target position by using the following equations. Note that values stored in the information processing device 220 at the time of the transition to the direct piloting mode (Step S117) are used to calculate the movement ratio and the piloting origin. Here, the homogeneous transformation matrix of the piloting origin is expressed by the following Equations (12) to (14).

$$^{dw}R_{\theta_{zco}} = \begin{bmatrix} \cos^{dw}\theta_{zco} & -\sin^{dw}\theta_{zco} & 0 \\ \sin^{dw}\theta_{zco} & \cos^{dw}\theta_{zco} & 0 \\ 0 & 0 & 1 \end{bmatrix} \quad (12)$$

$$^{dw}P_{co} = \begin{bmatrix} ^{dw}X_{co} \\ ^{dw}Y_{co} \\ ^{dw}Z_{co} \end{bmatrix} \quad (13)$$

$$^{dw}T_{co} = \begin{bmatrix} ^{dw}R_{\theta_{zco}} & ^{dw}P_{co} \\ 0 & 1 \end{bmatrix} \quad (14)$$

Furthermore, the homogeneous transformation matrix of the airframe target position is expressed by the following Equations (15) and (16). Note that $^{dw}R_{ref}$ is a rotation matrix representing a rotation component of the airframe 21.

$$^{dw}P_{ref} = \begin{bmatrix} ^{dw}X_{ref} \\ ^{dw}Y_{ref} \\ ^{dw}Z_{ref} \end{bmatrix} \quad (15)$$

$$^{dw}T_{ref} = \begin{bmatrix} ^{dw}R_{ref} & ^{dw}P_{ref} \\ 0 & 1 \end{bmatrix} \quad (16)$$

First, the parameter generation unit 221 calculates a target value of the relative movement amount of the airframe 21 based on the relative movement amount of the piloting device 10 received from the piloting device 10 and the movement ratio stored in the information processing device 220 at the time of the transition to the direct piloting mode by using the following Equation (17). That is, the parameter generation unit 221 multiplies the relative movement amount of the piloting device 10 received from the piloting device 10 by the movement ratio to calculate the translation component (that is, the relative movement amount of the mobile body 20) as the movement parameter. Note that the target value of the relative movement amount is a value representing a difference between the piloting coordinate system (DC) and the horizontal airframe coordinate system (DH).

$$^{dc}P_{ref} = \begin{bmatrix} ^{dc}X_{ref} \\ ^{dc}Y_{ref} \\ ^{dc}Z_{ref} \end{bmatrix} = s_m \begin{bmatrix} ^{cc}X_{ho} \\ ^{cc}Y_{ho} \\ ^{cc}Z_{ho} \end{bmatrix} \quad (17)$$

The parameter generation unit 221 uses the rotation component of the piloting device 10 received from the piloting device 10 as it is for the rotation component of the airframe 21.

$$^{dc}\theta_{zref} = {}^{cc}\theta_{zho} \quad (18)$$

$$^{dc}R_{\theta_{zref}} = \begin{bmatrix} \cos^{dc}\theta_{zref} & -\sin^{dc}\theta_{zref} & 0 \\ \sin^{dc}\theta_{zref} & \cos^{dc}\theta_{zref} & 0 \\ 0 & 0 & 1 \end{bmatrix} \quad (19)$$

$$= \begin{bmatrix} \cos^{cc}\theta_{zho} & -\sin^{cc}\theta_{zho} & 0 \\ \sin^{cc}\theta_{zho} & \cos^{cc}\theta_{zho} & 0 \\ 0 & 0 & 1 \end{bmatrix}$$

As described above, the homogeneous transformation matrix of the target value of the relative movement amount of the airframe 21 is expressed by the following Equation (20).

$$^{dc}T_{ref} = \begin{bmatrix} ^{dc}R_{zref} & ^{dc}P_{ref} \\ 0 & 1 \end{bmatrix} \quad (20)$$

The parameter generation unit 221 calculates the airframe target position based on the target value of the relative movement amount of the airframe 21 and the piloting origin by using the following Equation (21).

$$^{dw}T_{ref} = {}^{dw}T_{co}\, {}^{dc}T_{ref} \quad (21)$$

The parameter generation unit 221 can extract necessary components from $^{dw}T_{ref}$ to obtain $^{dw}P_{ref}$ and $^{dw}R_{ref}$. In addition, the parameter generation unit 221 obtains $^{dw}X_{ref}$, $^{dw}Y_{ref}$, and $^{dw}Z_{ref}$ as the movement parameters from $^{dw}P_{ref}$. In addition, the parameter generation unit 221 can decompose $^{dw}R_{ref}$ into the pan angle, the tilt angle, and the roll angle, and obtain the pan angle $^{dw}\theta_{zref}$ as the first posture parameter. A calculation method by which the parameter generation unit 221 obtains the angle $^{dw}\theta_{zref}$ of the pan shaft will be described later.

Rotation around an X axis and a Y axis is realized by the platform 24. The parameter generation unit 221 calculates the platform target position as the second posture parameter by using a method for calculating a platform target posture to be described later based on the posture component of the self-position acquired by the position estimation unit 212 of the mobile body 20 and the posture ($^{cw}\theta_t$ and $^{cw}\theta_r$) of the piloting device 10 transmitted from the piloting device 10.

Note that the pan shaft of the platform 24 and the position of the airframe 21 may be linked to each other in order to improve a response of the posture of the image capturing device 25 to the change of the posture of the piloting device 10. Specifically, since the platform 24 is directly driven by a motor, it can be expected that the posture of the platform 24 has better responsiveness than the posture of the airframe 21. Therefore, in a case of the rotation around the Z axis, until the self-position of the airframe 21 reaches the airframe target position, the amount of the difference between the airframe target position expressed by the following Equation (22) and the self-position of the airframe 21 may be compensated by the pan shaft of the platform 24.

platform target position ($\theta p$)=Airframe target position ($^{dw}\theta_{zref}$)−Airframe self-position ($^{dw}\theta_z$) (22)

The parameter generation unit 221 sets the obtained airframe target position in the airframe control unit 214 and sets the platform target position in the platform control unit 215 (Step S211).

Next, the mobile body 20 controls the airframe 21 and the platform 24 (Step S213). More specifically, the airframe control unit 214 in which the airframe target position is set controls the airframe 21 so that the set airframe target position and the self-position of the airframe 21 become the same as each other. The platform control unit 215 in which the platform target position is set controls the platform 24 so that the position of the platform 24 becomes a set platform control position. In this manner, the operation of the pilot in the piloting device 10 is reflected in the positions and postures of the airframe 21 and the platform 24.

Furthermore, the information processing device 220 may calculate a difference between the airframe target position and the current position of the airframe 21 or between the platform target position and the current position of the platform 24, and transmit the difference to the piloting device 10 via the communication control unit 213. The difference may be calculated by, for example, the parameter generation unit 221 included in the information processing device 220. The piloting device 10 may display a situation of reflection of the posture of the piloting device 10 in the mobile body 20 on the display unit 16 or the input/output unit 18 of the piloting device 10 by using the received difference. For example, as described in Section 3.5 of the following web page, when an image of the image capturing device 25 is displayed on the display unit 16 or the input/output unit 18, for example, the UI control unit 138 may perform perspective transformation, and it may be visually expressed that the posture of the image capturing device 25 does not keep up with the posture of the piloting device 10. (Reference URL)

http://www.interaction-ipsj.org/archives/paper2013/data/Interaction2013/oral/data/pdf/13INT012.pdf Hereinabove, the first processing example has been described. An effect of the information processing device 220 according to an embodiment of the present disclosure will be described. The information processing device 220 according to an embodiment of the present disclosure generates the movement parameter for controlling the movement of the mobile body 20 based on the ratio between the first distance from the piloting device 10 to the first position and the second distance from the mobile body 20 to the second position, and the movement of the piloting device 10. The movement of the mobile body 20 is controlled based on the generated movement parameter. Therefore, the pilot can control the movement of the mobile body 20 by moving the piloting device 10. In addition, since the movement of the mobile body 20 is controlled based on the ratio described above, the pilot can more easily imagine the movement of the mobile body 20. Therefore, the pilot can more easily control the movement of the mobile body 20.

Furthermore, in the information processing device 220 according to an embodiment of the present disclosure, the parameter generation unit 221 multiplies the ratio between the first distance and the second distance by the movement amount of the piloting device 10 to generate the movement amount of the mobile body 20 as the movement parameter. The movement amount of the mobile body 20 is controlled based on the generated movement amount. Therefore, since the mobile body 20 moves by the movement amount proportional to the movement amount of the piloting device 10, the pilot can more easily predict the movement of the mobile body 20. Therefore, the pilot can more easily control the movement of the mobile body 20.

Figure 13:
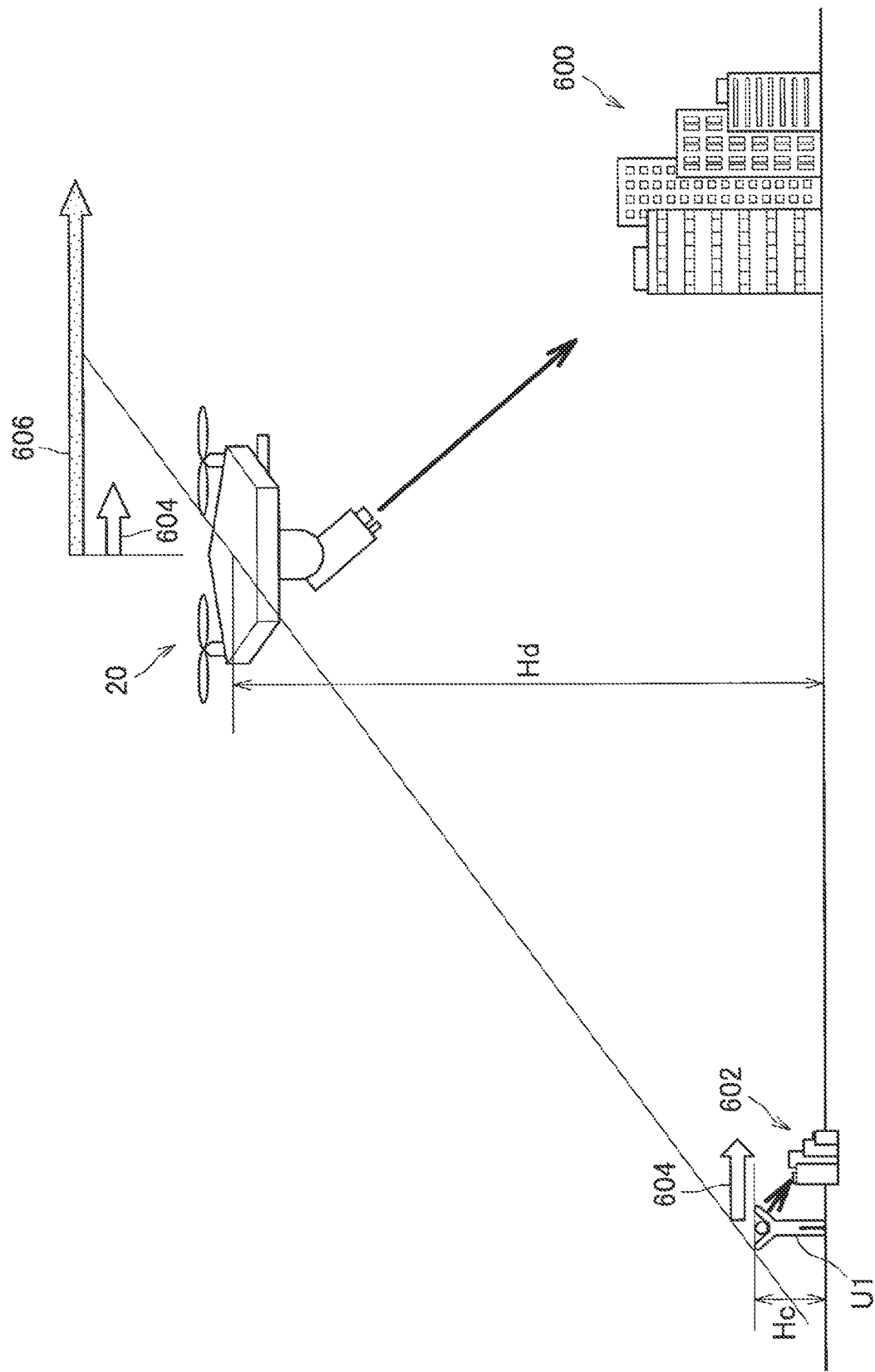
FIG. 13 is a diagram for describing an effect of the information processing device according to an embodiment of the present disclosure.

The effect of the information processing device 220 according to an embodiment of the present disclosure will be described in more detail with reference to FIG. 13. FIG. 13 is a diagram for describing the effect of the information processing device 220 according to an embodiment of the present disclosure. FIG. 13 illustrates the mobile body 20, an image capturing target 600 of the mobile body 20, a pilot U1 of the piloting device, and a miniature 602 imitating the image capturing target 600. An arrow 604 illustrated on the upper side of the pilot U1 of the piloting device 10 is an arrow schematically indicating the movement amount of the piloting device 10. Furthermore, an arrow 606 with points illustrated on the upper side of the mobile body 20 is an arrow schematically indicating the movement amount of the mobile body 20. The movement amount indicated by the arrow 606 is an amount calculated by multiplying the ratio between the above-ground height (Hc) of the piloting device and the above-ground height (Hd) of the mobile body 20 by the movement amount indicated by the arrow 604. Here, it is assumed that the ratio is n times.

As described above, in the first processing example, the first distance is the above-ground height (Hc) of the piloting device 10, and the second distance is the above-ground height (Hd) of the mobile body 20. Thus, the pilot U1 can control the movement of the mobile body 20 based on the ratio between the above-ground height of the piloting device 10 and the above-ground height of the mobile body 20. Therefore, the pilot U1 can more easily imagine the movement of the mobile body 20, and can more easily control the movement of the mobile body 20.

Furthermore, in the information processing device 220 according to an embodiment of the present disclosure, the parameter generation unit 221 generates the first posture parameter for causing the mobile body 20 to take a posture according to the posture of the piloting device 10. The posture corresponding to the posture of the piloting device 10 is realized by the mobile body 20 based on the first posture parameter. Therefore, since the posture of the piloting device 10 and the posture of the mobile body 20 are linked to each other, the pilot U1 can more easily control the movement of the mobile body 20.

Furthermore, in the present embodiment, the mobile body 20 includes the image capturing device 25 for capturing an image of a landscape. In the present embodiment, the pilot U1 can control the movement of the mobile body 20 only by moving the piloting device 10. Therefore, the pilot U1 can not only easily control the movement of the mobile body 20, but also cause the image capturing device 25 mounted on the mobile body 20 to more appropriately perform image capturing.

Furthermore, in the present embodiment, the mobile body 20 includes the platform 24 on which the image capturing device 25 is mounted. In addition, the parameter generation unit 221 included in information processing device 220 can generate the second posture parameter for causing the platform 24 to take the posture according to the posture of the piloting device 10. The posture of the platform 24 is controlled based on the second posture parameter, and the posture according to the posture of the piloting device 10 is realized. Thus, since the pilot U1 can control a direction in which the image capturing device 25 captures an image by adjusting the posture of the piloting device 10, it is possible to cause the image capturing device 25 mounted on the mobile body 20 to more easily and appropriately capture an image.

In the present embodiment, the piloting device 10 and the mobile body 20 are positioned away from each other and are communicably connected to each other. In the present embodiment, the piloting device 10 moves by being carried by the pilot U1 near the ground surface. On the other hand, the mobile body 20 is flying in the sky. As described above, even in a case where the piloting device 10 and the mobile body 20 are positioned away from each other, the pilot U1 can control the movement of the mobile body 20 only by moving the piloting device 10. That is, the pilot U1 can more easily control the movement of the mobile body 20 positioned away therefrom.

Furthermore, in an embodiment of the present disclosure, the mobile body 20 is a flying object. Specifically, the mobile body 20 is assumed to be a drone. In a case where the mobile body 20 is such a flying object, the pilot U1 can control the movement of the mobile body 20 by moving the piloting device 10 in the air. Thus, the pilot U1 can three-dimensionally control the mobile body 20. As described above, even in a case where the mobile body 20 is operated at a high height, the pilot U1 can pilot the mobile body 20 with ease, for example, an operation of going around the image capturing target 600 by only moving in a narrow range, as if the pilot U1 holds a video camera by hand and captures an image.

In addition, Patent Literature 1 described above describes a technology of measuring a movement amount of a pilot and moving a mobile body by the same movement amount. However, in a case where the mobile body 20 captures an image of the ground at a high height, the movement amount required to change an image capturing position is large, and it is not practical to cause the pilot to perform this movement. In particular, in a case where the user needs to move by the amount for changing the image capturing position, for example, when the user tries to move the mobile body 20 by 90° counterclockwise from a place where image capturing is performed at 45° at a height of 20 m, the pilot also needs to turn by 90° on a circle with a radius of 20 m. For this reason, the burden on the movement of the pilot is large, and it is also difficult to secure such a space around the pilot.

In general, image capturing in the air using a mobile body such as a drone is performed. In order to perform intended framing in the image capturing in the air, it is necessary to control an airframe of the drone or a gimbal platform on which the image capturing device is mounted while checking a preview of a captured image of the image capturing device mounted on the mobile body. However, it is demanding for the pilot to perform a control of all of the airframe, the gimbal platform, and the like while viewing a monitor on which the preview is displayed alone. In addition, in a case where the piloting of the airframe of the drone and the control of the image capturing device are shared by two pilots, it is difficult for the two pilots to notify each other of a direction in which they want to move the airframe or the gimbal platform. The drone is piloted using a proportional transmitter, but it is not intuitive what to move and where to move in order to adjust the framing of the image capturing device. Therefore, it is difficult to sensuously adjust the framing of the image capturing device.

In the present embodiment, the piloting device 10 moves by being carried by the pilot U1. For this reason, it is only necessary for the pilot U1 to move the piloting device 10 as if the pilot U1 captures an image of the miniature 602 in front of the pilot U1 by using a camera. Thus, the mobile body 20 or the platform 24 mounted on the mobile body 20 is controlled so that the framing of the image capturing device 25 intended by the pilot U1 is realized. As a result, the pilot U1 can more easily and intuitively perform the framing of the image capturing device 25 mounted on the mobile body 20 as compared with a case where the airframe 21 and the platform 24 are individually and manually controlled using the proportional transmitter.

2.2. Second Processing Example

In the first processing example, the above-ground heights of the piloting device 10 and the mobile body 20 are used for the calculation of the movement ratio (Sm). In the second processing example, instead of the above-ground heights, a ratio between distances to the gaze points is used to calculate the movement ratio (Sm).

Figure 14:
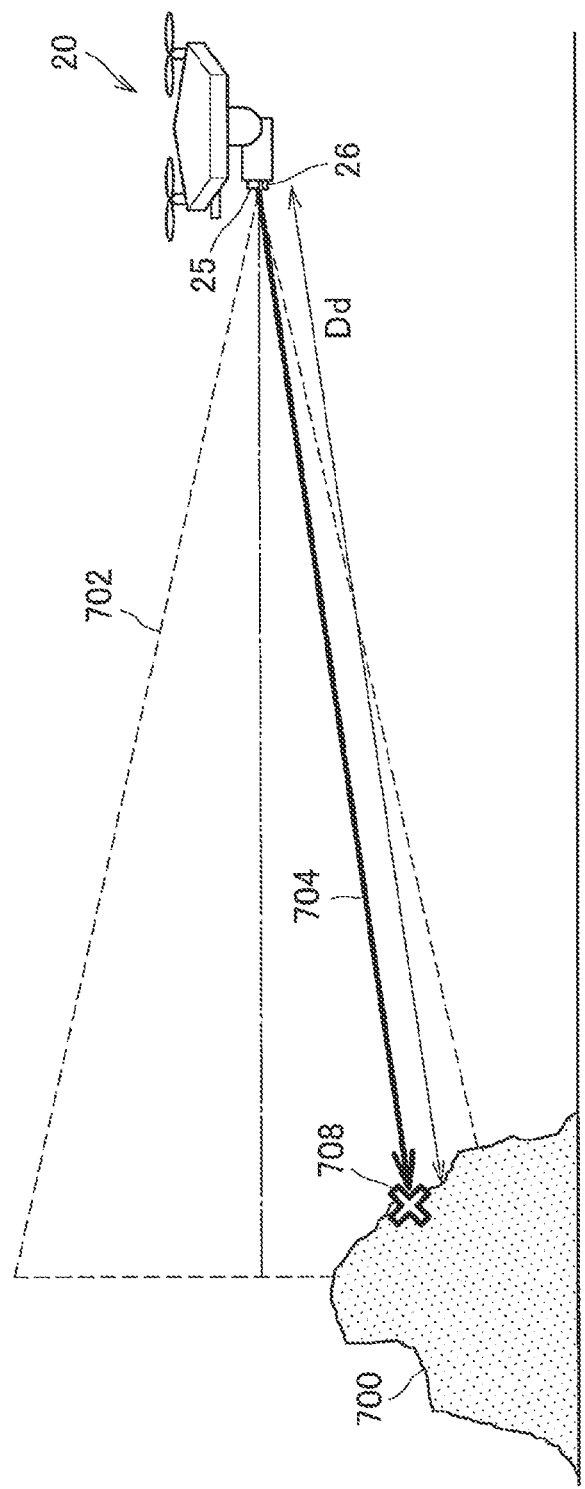
FIG. 14 is a diagram for describing a second gaze point of the mobile body.
Figure 15:
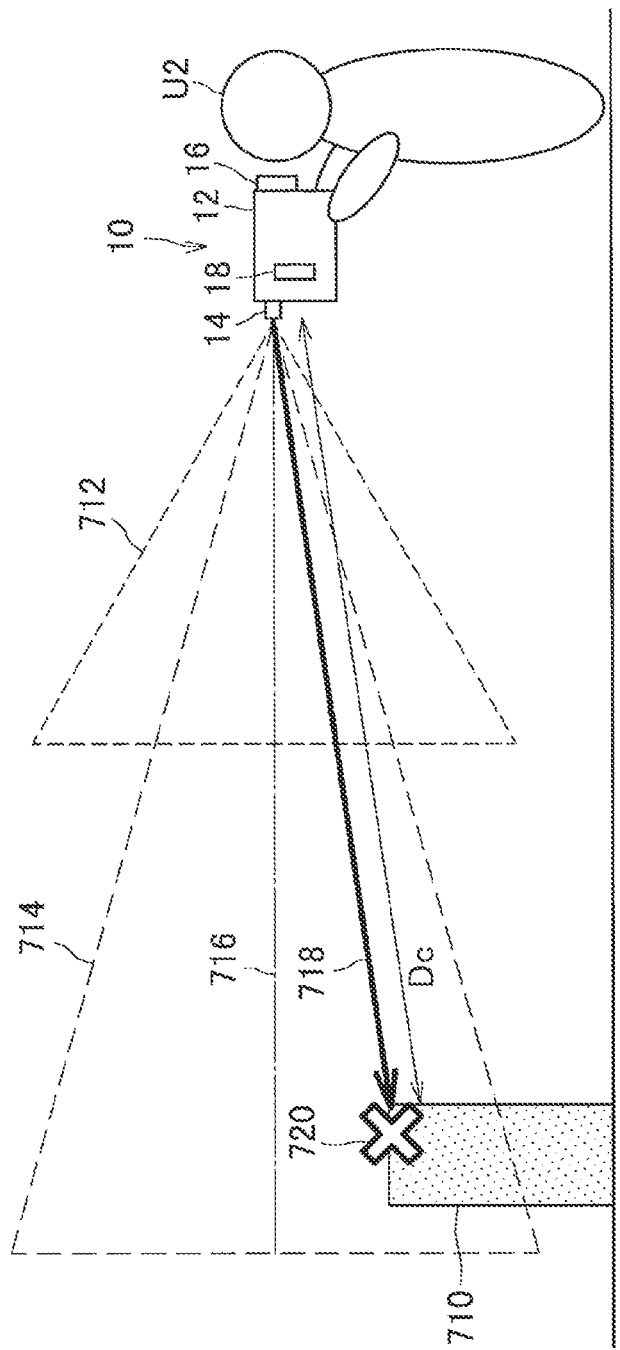
FIG. 15 is a diagram for describing a first gaze point of the piloting device.

The gaze points will be described with reference to FIGS. 14 and 15. FIG. 14 is a diagram for describing a second gaze point 708 of the mobile body 20. FIG. 14 illustrates the mobile body 20 and an image capturing target 700 positioned in front of the mobile body 20. The image capturing device 25 mounted on the mobile body 20 captures an image of the image capturing target 700. Note that a region 702 indicated by a broken line indicates a field of view of the image capturing device 25 and includes the second gaze point 708.

For example, the second gaze point may be included in the image capturing target 700 captured by the image capturing device 25. In the example illustrated in FIG. 14, the second gaze point 708 indicated by a cross mark is the gaze point. A direction 704 toward the second gaze point 708 of the image capturing device 25 is indicated by an arrow. In the second processing example, the distance measurement sensor 26 provided in the mobile body 20 measures a distance Dd from the mobile body 20 to the second gaze point 708 as the second distance. Note that, in the second processing example, the second gaze point 708 is the second position.

Next, a first gaze point 720 of the piloting device 10 will be described with reference to FIG. 15. FIG. 15 is a diagram for describing the first gaze point 720 of the piloting device 10. FIG. 15 illustrates the piloting device 10, a pilot U2 who pilots the piloting device 10, and an alternative target 710 positioned in front of the piloting device 10. Furthermore, a region 712 indicated by a dotted line is a field of view of the stereo camera 14. Furthermore, a region 714 indicated by a broken line is a virtual field of view based on the angle of view of the image capturing device 25 included in the mobile body 20, and includes the first gaze point 720. The first gaze point 720 is indicated by a cross mark on an upper portion of the alternative target 710. Further, a direction 718 toward the first gaze point 720 of the stereo camera 14 is indicated by an arrow. Note that, in the second processing example, the direction 718 in which the stereo camera 14 of the piloting device 10 views the first gaze point 720 and the direction 704 in which the image capturing device 25 of the mobile body 20 views the second gaze point 708 are the same as each other. Note that a state in which the two directions are the same as each other here includes not only a state in which the two directions completely coincide with each other but also a state in which the two directions are the same as each other to such an extent that the user feels that the two directions coincide with each other.

In the second processing example, the first gaze point 720 of the image capturing device 25 is included in the alternative target 710. The alternative target 710 is an alternative target that is an alternative of the image capturing target 700 of the image capturing device 25 mounted on the mobile body 20. For example, in a case where the image capturing target 700 illustrated in FIG. 14 is a rock or the like, the pilot U2 may select an object having a shape similar to the rock or the like as the alternative target 710 of the image capturing target 700. In the second processing example, the gaze point is set in a state where the stereo camera 14 mounted on the piloting device 10 is directed to an object around the pilot U2 who uses the piloting device 10. In the second processing example, a distance Dc from the piloting device 10 to the first gaze point 720 is measured as the first distance. Note that, in the second processing example, the first position is the first gaze point 720.

In the second processing example, a ratio between the distance Dd and the distance Dc is used as the movement ratio (Sm). Thus, the pilot U2 can capture an image of the image capturing target 700 by piloting the airframe 21 and the platform 24 as if the pilot U2 captures an image of an object around the pilot U2.

Hereinafter, processing performed by the piloting device 10 and the mobile body 20 in the second processing example will be described focusing on differences from the first processing example. Here, a description of substantially the same processing in the first processing example and the second processing example is omitted.

The gaze point needs to be set before the flight mode transitions to the direct piloting mode. In the second processing example, processing of a gaze point setting mode for setting the gaze point is performed in addition to the processing in the first processing example. In the gaze point setting mode, only the posture of the piloting device 10 is linked to the posture of the image capturing device 25 of the mobile body 20. Thus, the pilot U2 can adjust the posture of the image capturing device 25 by moving the piloting device 10 so that a place to be set as the second gaze point falls within the field of view of the image capturing device 25.

In the second processing example, the gaze point setting mode is always performed at the time of transition from another mode to the direct piloting mode. However, once the gaze point is set, the setting of the gaze point may be omitted.

Hereinafter, a flow of the transition of the flight mode of the mobile body 20 to the direct piloting mode when the gaze point is used will be described.

Here, it is assumed that an image captured by the image capturing device 25 of the mobile body 20 is constantly transmitted from the mobile body 20 to the piloting device 10, and the image is constantly displayed on the input/output unit 18 of the piloting device 10. Furthermore, the displayed image may include an image capturing time when the image capturing device 25 mounted on the mobile body 20 captures the image. Furthermore, the displayed image may include an image number that is incremented each time the image capturing device 25 captures an image. Information such as the image capturing time or the image number may also be transmitted to the piloting device 10.

First, the pilot U2 causes the mobile body 20 to hover in a state where a place desired to be set as the second gaze point is included in the field of view of the image capturing device 25 by using a manual piloting mode or the like in advance, while viewing the input/output unit 18. In addition, the pilot U2 stands in front of an alternative target such as an object that imitates the image capturing target or a wall around the pilot U2, and directs the piloting device 10 toward the alternative target. In this state, when the pilot U2 performs an operation for the transition of the flight mode to the gaze point setting mode using the UI of the input/output unit 18, the processing for the transition to the gaze point setting mode (that is, processing illustrated in FIG. 16 as described later) is started.

Figure 16:
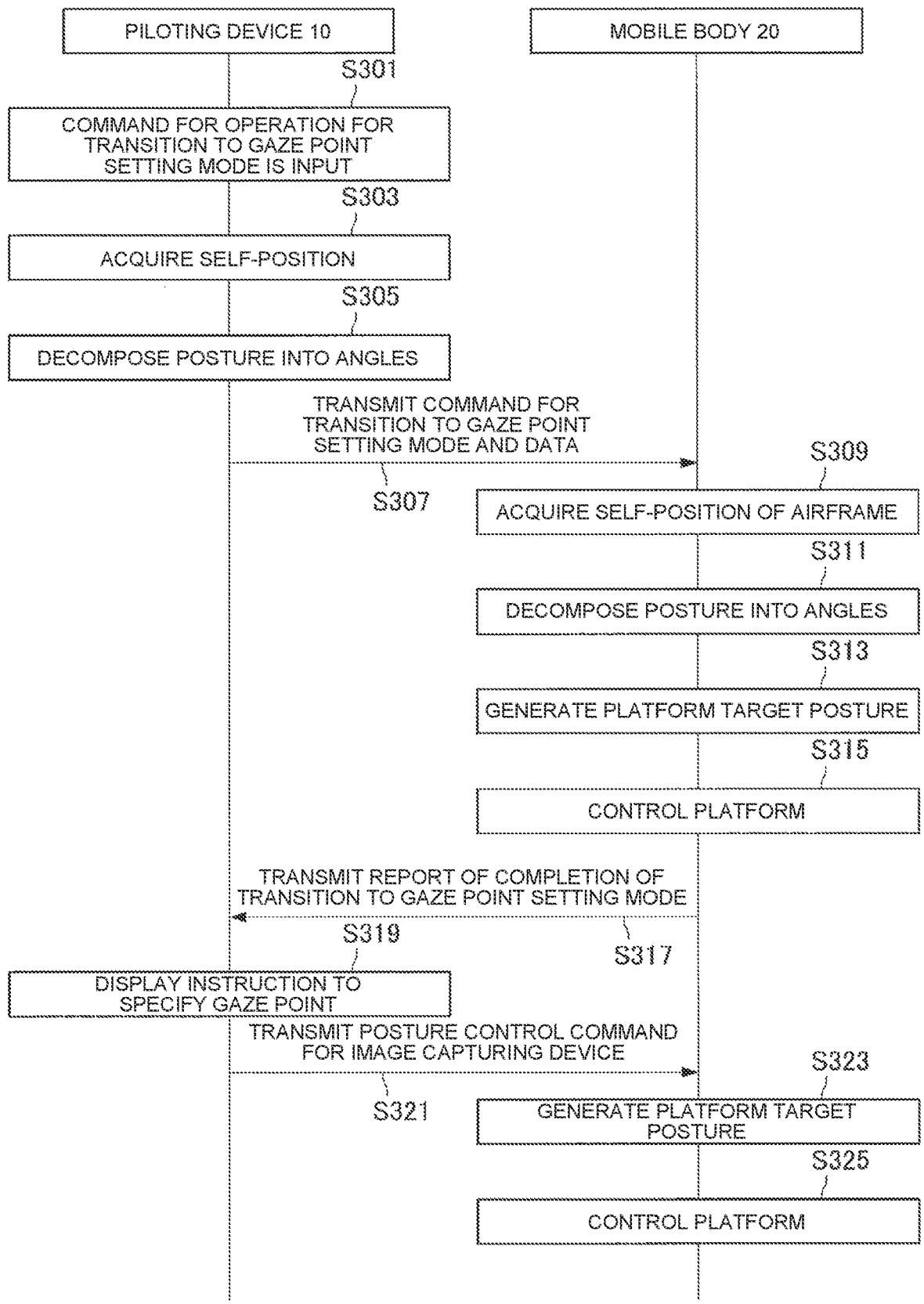
FIG. 16 is a flowchart illustrating processing in a process in which the flight mode of the mobile body transitions to a gaze point setting mode.

Hereinafter, processing performed by the piloting device 10 and the mobile body 20 in the second processing example will be described with reference to FIGS. 16 and 17. First, the processing performed by the piloting device 10 for the transition to the gaze point setting mode will be described. FIG. 16 is a flowchart illustrating processing in a process in which the flight mode of the mobile body 20 transitions to the gaze point setting mode.

When the pilot U2 performs an operation for the transition of the flight mode to the gaze point setting mode by using the UI of the input/output unit 18, a command for the operation for the transition to the gaze point setting mode is input to the piloting device 10 (Step S301). More specifically, the command for the operation for the transition to the gaze point setting mode input to the input/output unit 18 is transmitted to the command processing unit 135 via the UI control unit 138.

Next, when the command processing unit 135 receives the command for the operation for the transition to the gaze point setting mode, the command generation unit 136 acquires the current self-position of the piloting device 10 from the position estimation unit 132 of the piloting device 10 (Step S303).

Next, the command generation unit 136 decomposes the posture of the piloting device 10 into angles including the pan angle ($^{cw}\theta_p$), the tilt angle ($^{cw}\theta_t$), and the roll angle ($^{cw}\theta_r$) based on the acquired self-position (Step S305). Note that a method in which the command generation unit 136 decomposes the posture into the angles will be described later.

The storage unit 137 stores the pan angle ($^{cw}\theta_p$) of the calculated posture of the piloting device 10 as a gaze point setting mode origin ($^{cw}\theta_{pvp}$).

Next, the command generation unit 136 transmits a command for the transition to the gaze point setting mode to the mobile body 20 via the communication control unit 134 together with the following two data (Step S307).

(1) The current posture of the piloting device 10 (the tilt angle ($^{cw}\theta_t$), and the roll angle ($^{cw}\theta_r$))

(2) A pan shaft difference angle ($^{cv}\theta_p$) between the current posture of the piloting device 10 and the gaze point setting mode origin Note that the pan shaft difference angle ($^{cv}\theta_p$) is calculated by using the following Equation (23).

$$\text{Pan shaft difference angle } (^{cv}\theta_p) = \text{Posture of piloting device } (^{cw}\theta_p) - \text{Gaze point setting mode origin } (^{cw}\theta_{pvp}) \quad (23)$$

The mobile body 20 starts the processing for the transition to the gaze point setting mode by receiving the command for the transition to the gaze point setting mode from the piloting device 10. Hereinafter, the operation of the information processing device 220 at that time will be described.

Once the mobile body 20 receives the command for the transition to the gaze point setting mode from the piloting device 10, the information processing device 220 acquires the self-position of the airframe 21 from the position estimation unit 212 (Step S309).

Next, the information processing device 220 decomposes the current posture and calculates the pan angle (Step S311). The information processing device 220 stores the calculated pan angle as the gaze point setting mode origin ($^{dv}\theta_{pvp}$).

Next, the information processing device 220 generates the target posture of the platform 24 (Step S313). More specifically, the parameter generation unit 221 generates, as the target posture of the platform 24, the second posture parameter for causing the platform 24 to take the posture according to the posture of the piloting device 10 based on the current posture of the piloting device 10 received from the piloting device 10 and a posture component of the self-position of the airframe 21. Note that a method in which the parameter generation unit 221 generates the second posture parameter will be described later.

Next, the mobile body 20 controls the platform 24 (Step S315). More specifically, the information processing device 220 transmits the calculated target posture of the platform 24 to the platform control unit 215. The platform control unit 215 controls the platform 24 based on the transmitted target posture of the platform 24.

Once the control of the platform 24 is completed, the mobile body 20 transmits a report of completion of the transition to the gaze point setting mode to the piloting device 10 (Step S317). At this time, the information processing device 220 transitions to the gaze point setting mode.

Through the processing of Steps S301 to S317 described above, the posture of the piloting device 10 and the posture of the image capturing device 25 mounted on the mobile body 20 are synchronized with each other in terms of the tilt angle and the roll angle. Furthermore, also for the pan angle, operations for the posture of the piloting device 10 and the posture of the image capturing device 25 mounted on the mobile body 20 are relatively synchronized with each other from a timing at which the operation for the transition to the gaze point setting mode is performed.

Once the piloting device 10 receives the report of the completion of the transition to the gaze point setting mode from the mobile body 20, the mode of the piloting device 10 becomes the gaze point setting mode.

In the gaze point setting mode, the piloting device 10 displays an instruction to specify the gaze point through the UI of the input/output unit 18 via the UI control unit 138 (Step S319).

In the gaze point setting mode, the command processing unit 135 transmits, to the mobile body 20 via the communication control unit 134, the following two data as a posture control command for the image capturing device 25 (Step S321). Note that the transmission is periodically performed (at a rate at which the position estimation unit 132 of the piloting device 10 outputs the self-position).

(1) The current posture of the piloting device 10 (the tilt angle ($^{cw}\theta_t$), and the roll angle ($^{cw}\theta_r$))
(2) A pan shaft difference angle ($^{cv}\theta_p$) between the current posture of the piloting device 10 and the gaze point setting mode origin Note that the pan shaft difference angle ($^{cv}\theta_p$) is calculated by using the following Equation (24).

$$\text{Pan shaft difference angle } (^{cv}\theta_p) = \text{Posture of piloting device } (^{cw}\theta_p) - \text{Gaze point setting mode origin } (^{cw}\theta_{pvp}) \quad (24)$$

The mobile body 20 generates the target posture of the platform 24 (Step S323). More specifically, Once the posture control command for the image capturing device 25 is received from the piloting device 10, the parameter generation unit 221 generates the second parameter regarding the target posture of the platform 24 based on the received current posture of the piloting device 10 and the posture component of the self-position of the airframe 21. Note that a method in which the parameter generation unit 221 generates the second parameter will be described later. The generated second parameter is transmitted to the platform control unit 215.

Next, the mobile body 20 controls the platform 24 (Step S325). More specifically, the platform control unit 215 controls the platform 24 based on the second parameter acquired in Step S323.

The processing of Steps S321 to S325 described above is periodically performed, and the posture of the image capturing device 25 changes in synchronization with the posture of the piloting device 10 in the following gaze point setting mode. In this state, the gaze point is set.

Hereinafter, processing for the setting of the gaze point will be described with reference to FIG. 17. FIG. 17 is a flowchart illustrating processing for setting of the first and second gaze points. Hereinafter, a description will be provided with the flowchart illustrated in FIG. 17.

First, a flow of the processing in the piloting device 10 will be described.

First, the piloting device 10 sets the gaze point (Step S401). The gaze point is set, for example, by the pilot U2 operating the piloting device 10. Here, two methods in which the pilot U2 sets the gaze point in the piloting device 10 will be described.

In the first method, the pilot U2 changes the posture of the piloting device 10 to set the second gaze point at the center of the image of the image capturing device 25 displayed on input/output unit 18 of the piloting device 10. Next, the pilot U2 presses a button for setting the second gaze point in the UI displayed on the input/output unit 18. As a result, the image coordinates of the second gaze point are fixed to the center of the image displayed on the input/output unit 18.

In the second method, the pilot U2 changes the posture of the piloting device 10 to set the second gaze point at an arbitrary place on the image of the image capturing device 25 displayed on input/output unit 18 of the piloting device 10. Next, the pilot U2 touches the place for the second gaze point on the image in the UI displayed on the input/output unit 18.

Although the two methods in which the pilot U2 sets the gaze point have been described above, the method for setting the second gaze point is not limited to the above methods.

Once the gaze point is set, the piloting device 10 measures the distance Dc from the piloting device 10 to the first gaze point (Step S403). More specifically, the distance measurement unit 133 measures the distance (Dc) from the piloting device 10 to the first gaze point based on the image captured by the stereo camera 14.

Note that the distance (Dc) from the piloting device 10 to the first gaze point is a depth when viewed by the stereo camera 14 of the piloting device 10 in the same direction as a direction from the image capturing device 25 of the mobile body 20 toward the second gaze point. Hereinafter, a method of measuring the depth (Dc) corresponding to the image coordinates of the image capturing device 25 of the second gaze point specified by the input/output unit 18 will be described.

Figure 18:
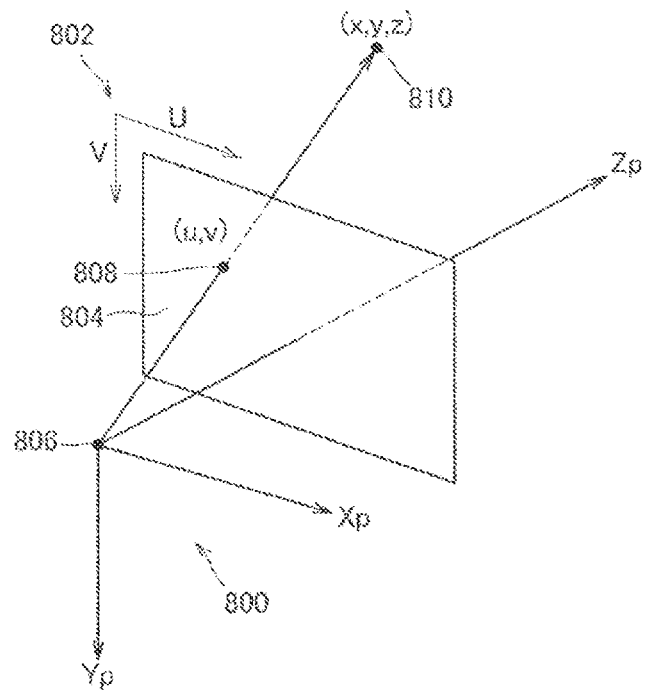
FIG. 18 is a diagram illustrating a coordinate system in a pinhole camera model.

Here, it is assumed that both the stereo camera 14 of the piloting device 10 and the image capturing device 25 of the mobile body 20 are both pinhole camera models. The pinhole camera model is disclosed, for example, in the following web pages.
(Reference URL)
https://docs.opencv.org/2.4/modules/calib3d/doc/camera_calibration_and_3d_reconstruction.html
https://jp.mathworks.com/help/vision/ug/camera-calibration.html The definition of a coordinate system in the pinhole camera model is illustrated in FIG. 18. FIG. 18 is a diagram illustrating the coordinate system in the pinhole camera model. Coordinate axes 800 in an orthogonal coordinate system of a three-dimensional space, coordinate axes 802 defining image coordinates, and an image plane 804 including the image coordinates are illustrated. The coordinate axes 800 in the orthogonal coordinate system of the three-dimensional space include three axes (Xp axis, Yp axis, and Zp axis) orthogonal to each other. It is assumed that the Zp axis corresponds to the optical axis direction of the stereo camera 14 and the image capturing device 25. Further, the coordinate axes 802 defining the image coordinates include two axes (U and V) orthogonal to each other. Hereinafter, a method of measuring the distance from the piloting device 10 to the first gaze point will be described using this coordinate system.

In the pinhole camera model, there is a relationship expressed by the following Equations (25) to (28) between a point (x,y,z) 810 on the three-dimensional space and an intersection (u,v) between a line connecting an origin 806 and the point (x,y,z) 810 and the image plane 804.

$$\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} x' \\ y' \\ 1 \end{bmatrix} = K \begin{bmatrix} x' \\ y' \\ 1 \end{bmatrix} \quad (25)$$

$$\begin{bmatrix} x \\ y \\ 1 \end{bmatrix} = z \begin{bmatrix} x' \\ y' \\ 1 \end{bmatrix} \quad (26)$$

$$K = \begin{bmatrix} f_x & 0 & c_x \\ 0 & f_y & c_y \\ 0 & 0 & 1 \end{bmatrix} \quad (27)$$

$$K^{-1} = \begin{bmatrix} 1/f_x & 0 & -c_x/f_x \\ 0 & 1/f_y & -c_y/f_y \\ 0 & 0 & 1 \end{bmatrix} \quad (28)$$

Here, fx and fy are focal lengths expressed in pixel units, and cx and cy are image coordinates of a principal point. A matrix K including fx, fy, cx, and cy is referred to as an internal parameter. The internal parameter is different for each type of the stereo camera 14 or the image capturing device 25. It is assumed that $K_d$ is the internal parameter of the image capturing device 25 of the mobile body 20, and that $K_c$ is the internal parameter of the stereo camera 14 of the piloting device 10. In addition, image coordinates of the image capturing device 25 of the gaze point specified by the input/output unit 18 are represented by $u_d$ and $v_d$, and image coordinates in a corresponding direction in the stereo camera 14 are represented by $u_c$ and $v_c$.

When a direction of a point ($u_d$, $v_d$) on the image viewed by the image capturing device 25 is the same as a direction of a point ($u_c$, $v_c$) on the image viewed by the stereo camera 14 of the piloting device 10, x' and y' viewed by the image capturing device 25 are equal to x' and y' viewed by the stereo camera 14. At this time, the following Equations (29) and (30) are satisfied.

$$\begin{bmatrix} u_c \\ v_c \\ 1 \end{bmatrix} = K_c \begin{bmatrix} x' \\ y' \\ 1 \end{bmatrix} \quad (29)$$

$$\begin{bmatrix} u_d \\ v_d \\ 1 \end{bmatrix} = K_d \begin{bmatrix} x' \\ y' \\ 1 \end{bmatrix} \quad (30)$$

Therefore, in the stereo camera 14, the image coordinates $u_c$ and $v_c$ in a direction corresponding to the direction viewed by the image capturing device 25 are obtained by the following Equation (31).

$$\begin{bmatrix} u_c \\ v_c \\ 1 \end{bmatrix} = K_c K_d^{-1} \begin{bmatrix} u_d \\ v_d \\ 1 \end{bmatrix} \quad (31)$$

The distance measurement unit 133 measures the depth Dc (that is, the distance from the piloting device 10 to the first gaze point) in a direction corresponding to the image coordinates $u_c$ and $v_c$.

The internal parameter $K_d$ of the image capturing device 25 of the mobile body 20 may be stored in the piloting device 10 in advance, or may be acquired by the piloting device 10 from the mobile body 20 via the communication control unit 134 before the processing of Step S403 is performed. Furthermore, in a case where the image capturing device 25 includes a zoom mechanism, the internal parameter $K_d$ varies depending on a zoom magnification. For this reason, the piloting device 10 may have a table of values of $K_d$ corresponding to the zoom magnification, or may acquire the values from the mobile body 20 every time a zoom operation is performed.

Furthermore, at the time of setting the gaze point, the image of the image capturing device 25 is displayed on the input/output unit 18. In addition to the image, the input/output unit 18 may superimpose and display the image of the stereo camera 14 of the piloting device 10 and the gaze point position in the image. Note that the image of the stereo camera 14 may be images of both the left and right cameras of the stereo camera 14, or may be an image of any one of the left and right cameras. In addition, in order to easily aim the gaze point, in the piloting device 10, for example, a hole or a sight that allows visual recognition of a front area is provided in an upper portion of the display unit 16 or the like.

Next, the piloting device 10 acquires the self-position thereof (Step S405). More specifically, the position estimation unit 132 acquires the current position of the piloting device 10. The acquired self-position is stored as the piloting origin in the storage unit 137 of the command processing unit 135.

Subsequently, the command generation unit 136 decomposes the posture of the piloting device 10 based on the self-position acquired in Step S405 and generates the pan angle ($^{cw}\theta_p$), the tilt angle ($^{cw}\theta_t$), and the roll angle ($^{cw}\theta_r$) (Step S407). A method in which the command generation unit 136 decomposes the posture of the piloting device 10 and calculates these angles will be described later.

Next, the piloting device 10 transmits a command for the transition to the direct piloting mode to the mobile body 20 via the communication control unit 134 together with the following four data (Step S409).

(1) The distance (Dc) from the piloting device 10 to the first gaze point
(2) The image coordinates of the gaze point
(3) The current posture of the piloting device 10 (the tilt angle ($^{cw}\theta_t$), and the roll angle ($^{cw}\theta_r$))
(4) The image capturing time or image number of the image of the image capturing device 25 used at time of setting the gaze point Note that the data of (4) is not necessarily transmitted to the mobile body 20, but can be used in Step S411 as described later.

Once the command for the transition to the direct piloting mode is transmitted to the mobile body 20, the piloting device 10 waits for the report of the completion of the transition to the direct piloting mode from the mobile body 20.

Next, a flow of the processing in the mobile body 20 at the time of setting the gaze point will be described.

Once the command for the transition to the direct piloting mode is received from the piloting device 10, the mobile body 20 measures the distance Dd from the mobile body 20 to the second gaze point (Step S411). More specifically, the distance measurement sensor 26 sets a point corresponding to the center of the image of the image capturing device 25 or the image coordinates of the gaze point transmitted from the piloting device 10 as the second gaze point, and measures the depth (Dd) in a direction corresponding to the second gaze point. The measured distance (Dd) is transmitted to the information processing device 220.

Note that the image displayed on the input/output unit 18 and the like when the pilot U2 sets the gaze point in the piloting device 10 is captured at a timing earlier than the timing at which the distance (Dd) is measured. Therefore, the mobile body 20 may buffer information (for example, depth data or the like) necessary for measuring the distance (Dd). The distance measurement sensor 26 may measure the distance (Dd) using the past corresponding information by using the image capturing time or image number of the image of the image capturing device 25 used at the time of setting the gaze point, the image capturing time or image number being received together with the command for the transition to the direct piloting mode.

Next, the information processing device 220 calculates the movement ratio (Step S413). More specifically, the parameter generation unit 221 calculates the movement ratio by using the distance (Dc) from the piloting device 10 to the first gaze point received from the piloting device 10 and the distance (Dd) from the airframe 21 to the second gaze point measured by the distance measurement sensor 26 based on the following Equation (32).

$$\text{Movement ratio } (Sm) = \text{Distance from airframe to second gaze point } (Dd)/\text{Distance from piloting device to first gaze point } (Dc) \qquad (32)$$

Next, the information processing device 220 acquires the current self-position of the airframe 21 from the position estimation unit 212 (Step S415). The information processing device 220 stores the acquired self-position in the storage unit 225 as the piloting origin.

The mobile body 20 transmits the report of the completion of the transition to the direct piloting mode to the piloting device 10 (Step S417). More specifically, the report information generation unit 222 transmits the report of the completion of the transition to the direct piloting mode to the piloting device 10 via the communication control unit 213.

Figure 17:
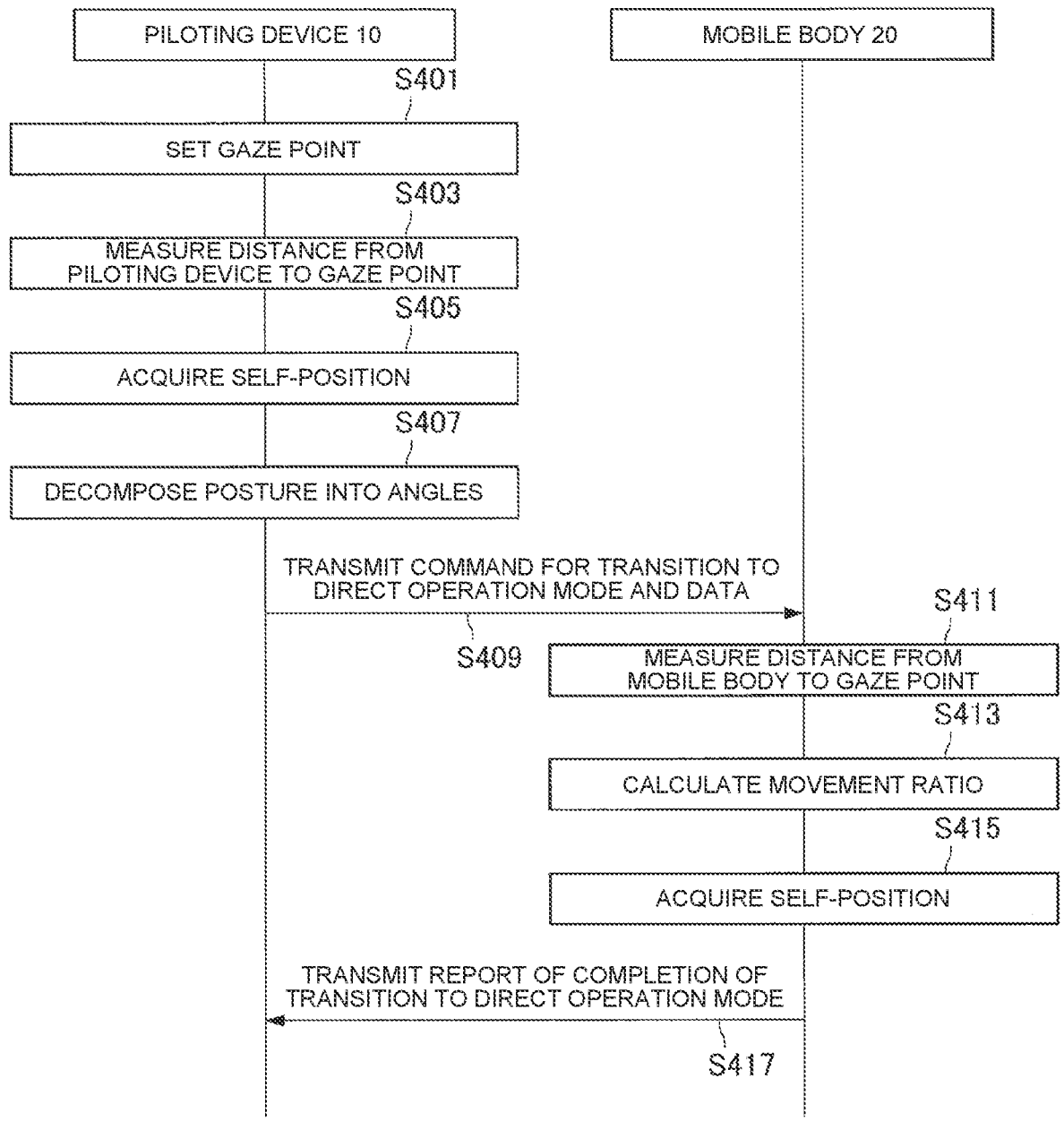
FIG. 17 is a flowchart illustrating processing for setting of the first and second gaze points.

As described above, both the piloting device 10 and the mobile body 20 transition to the direct piloting mode by the processing illustrated in FIG. 17. After the transition of the piloting device 10 and the mobile body 20 to the direct piloting mode, the processing illustrated in FIG. 12 is performed as in the first processing example, such that the movement amount of the piloting device 10 can be reflected in the movement amount of the mobile body 20 based on the ratio of the distances to the gaze points.

Note that, in the gaze point setting mode, the piloting device 10 may include a button (hereinafter, also referred to as a "temporary link release button") for preventing the postures of the piloting device 10 and the image capturing device 25 mounted on the mobile body 20 in the pan shaft direction from being temporarily linked to each other. Here, an operation of the temporary link release button will be described.

In this case, the piloting device 10 performs the following processing. While the pilot U2 presses the temporary link release button, the piloting device 10 does not transmit the pan shaft difference angle ($^{cv}\theta_p$) to the mobile body 20. When the pilot U2 releases the temporary link release button, the piloting device 10 calculates the gaze point setting mode origin ($^{cw}\theta_{pvp}$) based on the current self-position of the piloting device 10 by using a method similar to the above-described calculation method (for example, the calculation method used in Step S303). The piloting device 10 updates the calculated gaze point setting mode origin ($^{cw}\theta_{pvp}$), and transmits a command (hereinafter, also referred to as a "gaze point setting mode origin reset command") for resetting the origin of the gaze point setting mode to the mobile body 20.

Next, the mobile body 20 performs the following operation. Once the gaze point setting mode origin reset command is received, the gaze point setting mode origin ($^{dv}\theta_{pvp}$) stored in the mobile body 20 is calculated and updated based on the current self-position of the airframe 21 by using a method similar to the above-described calculation method (for example, the calculation method used in Step S311).

With the above-described operation, the movement of the piloting device 10 in the pan shaft direction is not reflected in the mobile body 20 while the pilot U2 presses the temporary link release button. Therefore, when the pilot U2 brings the gaze point of the piloting device 10 into alignment with an object around the pilot U2, it is possible to adjust a deviation from the gaze point of the mobile body 20.

Hereinabove, the second processing example has been described.

In the second processing example, the first position is the first gaze point captured by the stereo camera 14 included in the piloting device 10, and the second position is the second gaze point captured by the image capturing device 25 included in the mobile body 20. Thus, the pilot U2 can easily grasp the ratio between the first distance and the second distance, and can more easily control the movement of the mobile body 20.

Furthermore, in the second processing example, the second gaze point is included in the image capturing target 700 captured by the image capturing device 25, and the first gaze point is included in the alternative target 710 that is an alternative of the image capturing target 700. Thus, the pilot U2 can cause the image capturing device 25 included in the mobile body 20 to capture an image of the image capturing target 700 as if capturing an image of the alternative target 710.

Moreover, in the second processing example, the direction in which the stereo camera 14 of the piloting device 10 views the first gaze point and the direction in which the image capturing device 25 of the mobile body 20 views the second gaze point are the same as each other. Thus, the pilot U2 can cause the image capturing device 25 to appropriately capture an image more easily.

2.3. Supplementary Description of Calculation Method

[(A) Method of Decomposing Posture into Angle Components Including Pan Shaft, Tilt Shaft, and Roll Shaft]

Here, a method of decomposing into angles of respective three axes including the pan shaft, the tilt shaft, and the roll shaft by the three-dimensional rotation matrix R will be described. Specifically, a method in which the command generation unit 136 decomposes the posture of the piloting device 10 into angles and a method in which the parameter generation unit 221 generates the first posture parameter will be described. For example, a calculation method used in Steps S107, S117, S203, S209, S305, S407, or the like in the above-described embodiment will be described.

The respective angles in the pan shaft, the tilt shaft, and the roll shaft are defined as a pan angle θp, a tilt angle $θ_t$, and a roll angle $θ_r$, respectively, and rotation matrices corresponding to the respective axes are defined as $R_p$, $R_t$, and $R_r$, respectively. At this time, the rotation matrices $R_p$, $R_t$, and $R_r$ are expressed by the following Equations (33) to (35), respectively.

$$R_p(θ_p) = \begin{bmatrix} \cosθ_p & -\sinθ_p & 0 \\ \sinθ_p & \cosθ_p & 0 \\ 0 & 0 & 1 \end{bmatrix} \quad (33)$$

$$R_t(θ_t) = \begin{bmatrix} \cosθ_t & 0 & \sinθ_t \\ 0 & 1 & 0 \\ -\sinθ_t & 0 & \cosθ_t \end{bmatrix} \quad (34)$$

$$R_r(θ_r) = \begin{bmatrix} 0 & 0 & 0 \\ 0 & \cosθ_r & -\sinθ_r \\ 0 & \sinθ_r & \cosθ_r \end{bmatrix} \quad (35)$$

Since the rotation around all the three axes is a combination of the rotations around the respective axes, the rotation matrix R can be expressed by the following Equation (36).

$$R = \qquad (36)$$
$$R_p(θ_p)R_t(θ_t)R_r(θ_r) = \begin{bmatrix} \cosθ_p\cosθ_t & -\sinθ_p\cosθ_r + \cosθ_p\sinθ_t\sinθ_r & \sinθ_p\sinθ_r + \cosθ_p\sinθ_t\cosθ_r \\ \sinθ_p\cosθ_t & \cosθ_p\cosθ_r + \sinθ_p\sinθ_t\sinθ_r & -\cosθ_p\sinθ_r + \sinθ_p\sinθ_t\cosθ_r \\ -\sinθ_t & \cosθ_t\sinθ_r & \cosθ_t\cosθ_r \end{bmatrix}$$

From Equation (36), the pan angle, the tilt angle, and the roll angle are obtained using the following Equations (37) to (39) using the components of the rotation matrix R.

$$θ_p = \tan^{-1}(R_{21}/R_{11}) \quad (37)$$

$$θ_t = \sin^{-1}(-R_{31}) \quad (38)$$

$$θ_r = \tan^{-1}(R_{32}/R_{33}) \quad (39)$$

[(B) Calculation Method of Platform Target Posture]

Next, a method in which the parameter generation unit 221 generates the second posture parameter (a parameter for controlling the posture of the platform 24) will be described. For example, a calculation method used in Steps S119, S313, S323, or the like in the above-described embodiment will be described. In consideration of the posture of the mobile body 20, the posture of the platform 24 for realizing the specified posture of the image capturing device 25 is calculated based on the following Equations (40) to (43).

A rotation matrix $^{dh}R_b$ representing the relationship between the horizontal airframe coordinate system (DH) and the airframe coordinate system (DB) can be expressed as follows and is a rotation matrix of only the tilt shaft component by the roll shaft component (excluding the pan shaft component), where $^{dh}R_{bp}$, $^{dh}R_{bt}$, and $^{dh}R_{br}$ are obtained by decomposing a rotation matrix $^{dw}R$ representing the posture of the self-position of the mobile body 20 into rotation matrices of the pan shaft, the tilt shaft, and the roll shaft.

$$^{dh}R_b = {}^{dh}R_{bt}{}^{dh}R_{br} \quad (40)$$

A rotation matrix $^{dh}R_s$ representing the relationship between the horizontal airframe coordinate system (DH) and the image capturing device coordinate system (DS) can be expressed by the following Equation (41) using the rotation matrices (the rotation matrix of the tilt shaft ($^{dh}R_{st} = {}^{dh}R_s({}^{dw}θ_{ts})$) and the rotation matrix of the roll shaft ($^{dh}R_{sr} = Rr({}^{dw}θ_{rs})$)) of the respective axes.

$$^{dh}R_s = {}^{dh}R_{st}{}^{dh}R_{sr} \quad (41)$$

Assuming that a rotation matrix of the posture changed by the platform 24 is $^{db}R_s$, a relationship between $^{dh}R_s$ and $^{dh}R_b$ is expressed by the following Equation (31).

$$^{dh}R_s = {}^{dh}R_b{}^{db}R_s \quad (42)$$

From the above, when the posture of the mobile body 20 is $^{dh}R_b$, the posture $^dR_s$ of the platform 24 necessary for causing the image capturing device 25 to take the posture $^{dh}R_s$ in the horizontal airframe coordinate system (DH) is obtained by using the following Equation (43).

$$^{db}R_s = {}^{db}R_b^{-1}{}^{db}R_s \quad (43)$$
$$= {}^{db}R_b^{T}{}^{db}R_s$$

Among the pan angle, the tilt angle, and the roll angle obtained by decomposing the obtained by $^{db}R_s$ using the calculation method (A) described above, the tilt angle and the roll angle become the target posture of the platform 24.

3. Modified Example

Figure 20:
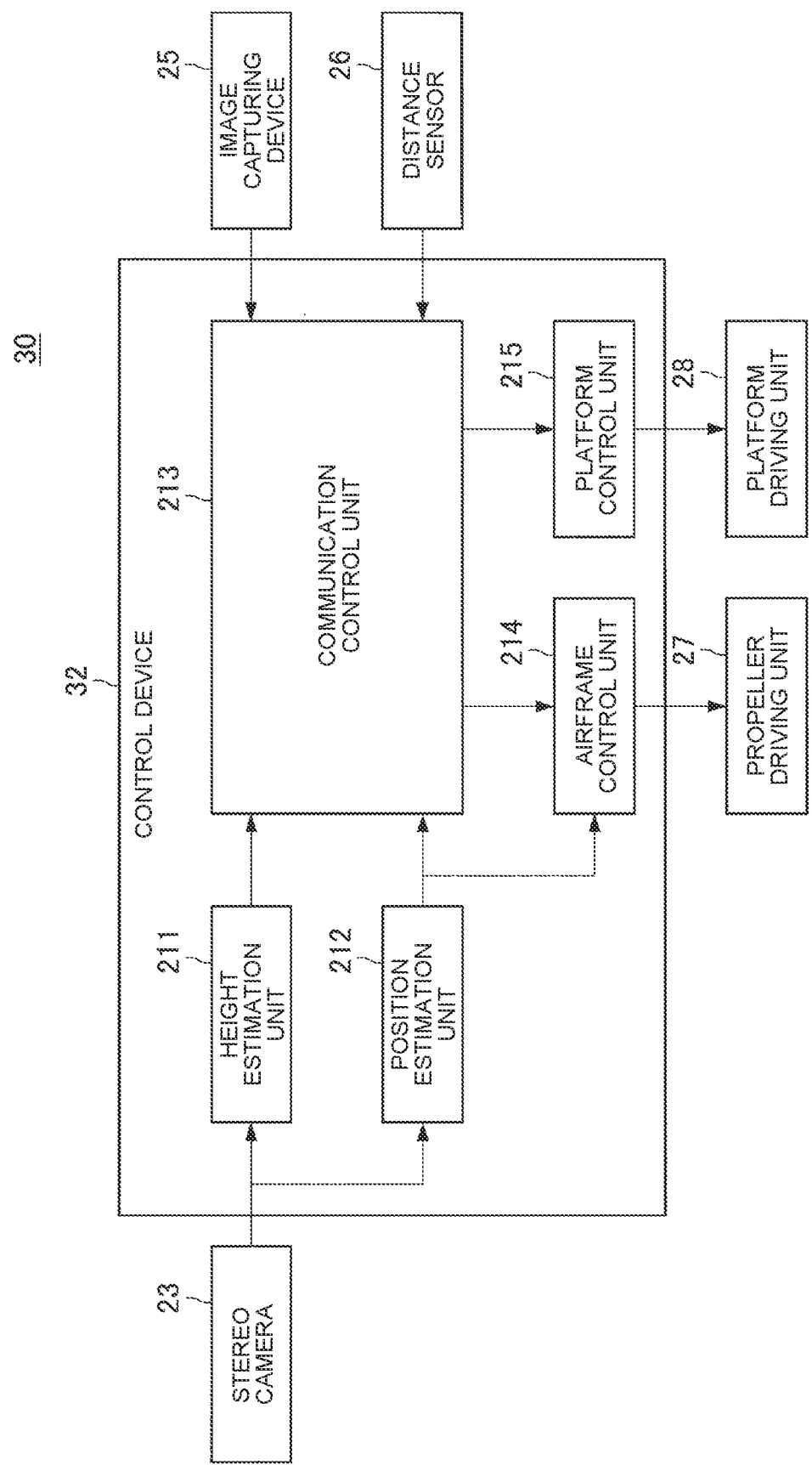
FIG. 20 is a functional block diagram illustrating a configuration of a mobile body according to a modified example.
Figure 21:
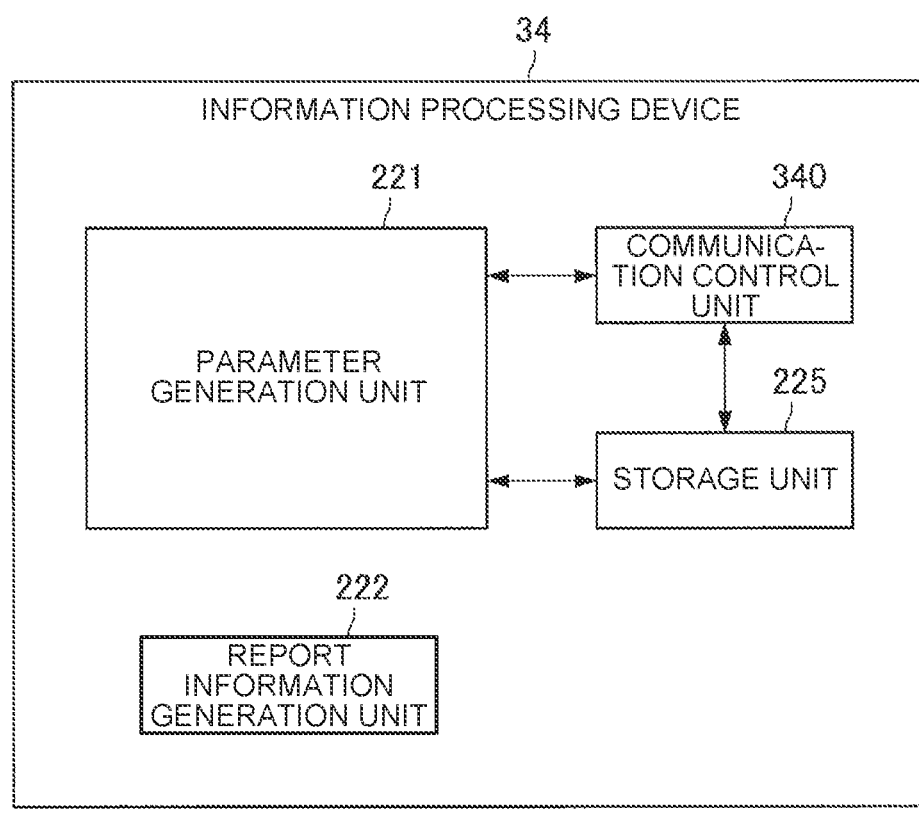
FIG. 21 is a functional block diagram illustrating a configuration of an information processing device according to a modified example.

Next, a modified example of the above-described embodiment will be described with reference to FIGS. 19 to 21. In the above-described embodiment, the mobile body 20 includes the information processing device 220. The information processing device according to the present disclosure is not limited thereto, and may be provided outside the mobile body. In the modified example, a case where the information processing device is provided outside the mobile body will be described. An information processing device 34 according to the modified example may be, for example, a mobile terminal or the like possessed by the user.

Figure 19:
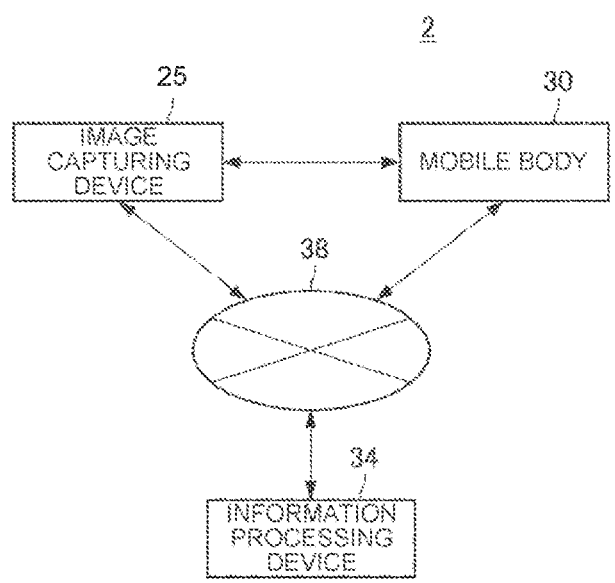
FIG. 19 is a diagram illustrating a configuration of an information processing system according to a modified example.

FIG. 19 is a diagram illustrating a configuration of an information processing system 2 according to the modified example. As illustrated in FIG. 2, the information processing system 2 includes the piloting device 10, a mobile body 30, and an information processing device 34. In the modified example, the piloting device 10, the mobile body 30, and the information processing device 34 are connected to each other via a network 38. Further, the piloting device 10 and the mobile body 30 are communicably connected to each other without the network 38.

Note that the network 38 may include a public line network such as a telephone line network, the Internet, or a satellite communication network, a local area network (LAN), a wide area network (WAN), and the like. In addition, the network 38 may include a dedicated line network such as an Internet protocol-virtual private network (IP-VPN).

Next, a configuration of the mobile body 30 according to the modified example will be described with reference to FIG. 20. FIG. 20 is a functional block diagram illustrating a configuration of the mobile body 20 according to the modified example. As illustrated in FIG. 20, the mobile body 30 according to the modified example does not include the information processing device. Information acquired by the height estimation unit 211, the position estimation unit 212, the image capturing device 25, and the distance measurement sensor 26 is transmitted to the communication control unit 213. The communication control unit 213 transmits information for controlling movement of the mobile body 30 to the information processing device 34 via the network 38 in order to cause the information processing device 34 to generate information as necessary.

Furthermore, the mobile body 30 receives the information for controlling the airframe 21 or the platform 24 by the communication control unit 213 from the information processing device 34 via the network 38, and transmits the information to the airframe control unit 214 or the platform control unit 215. As a result, the positions or postures of the airframe 21 and the platform 24 are controlled.

Next, a configuration of the information processing device 34 according to the modified example will be described with reference to FIG. 21. FIG. 21 is a functional block diagram illustrating the configuration of the information processing device 34 according to the modified example. Similarly to the information processing device 220 illustrated in FIG. 6, the information processing device 34 includes a parameter generation unit 221, a report information generation unit 222, and a storage unit 225. The information processing device 34 according to the modified example includes a communication control unit 340 in addition to these functional units. The information processing device 34 receives information related to the motion of the mobile body 30 through the communication control unit 340 as necessary, and generates information for controlling the motion of the mobile body 30 based on the received information. For example, the parameter generation unit 221 generates various parameters for controlling the position or posture of the airframe 21 or the platform 24. In the information processing device 34, the communication control unit 340 transmits the generated information to the piloting device 10 or the mobile body 30 via the network 38.

4. Hardware Configuration Example

Figure 22:
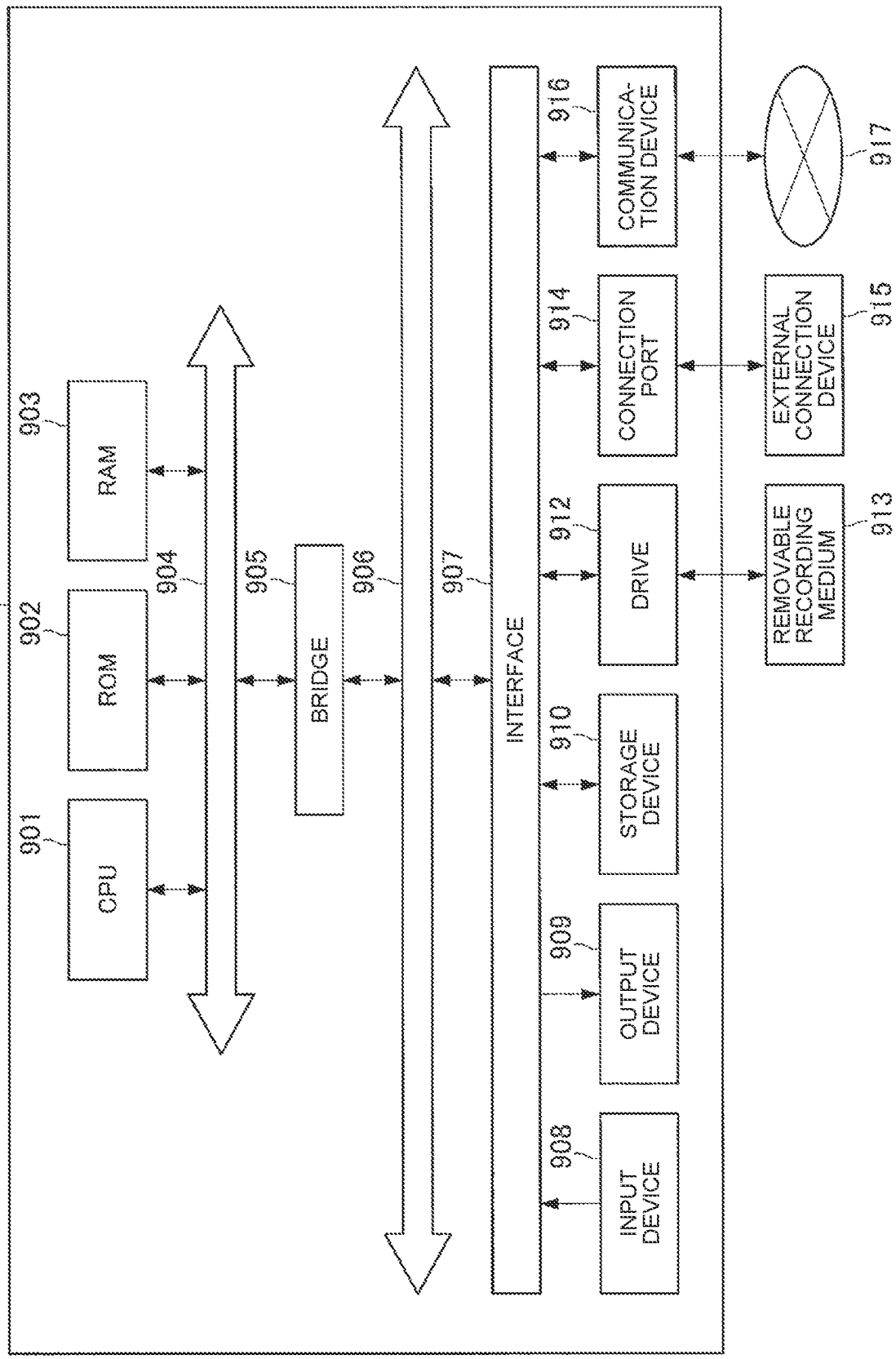
FIG. 22 is a functional block diagram illustrating a hardware configuration example of the information processing device or the like according to an embodiment of the present disclosure.

Next, an example of a hardware configuration of the processing device 13, the control devices 27 and 32, or the information processing devices 34 and 220 (hereinafter, also collectively referred to as "information processing device or the like") included in the information processing system 1 or 2 according to an embodiment of the present disclosure will be described in detail with reference to FIG. 22. FIG. 22 is a functional block diagram illustrating a hardware configuration example of the information processing device or the like according to an embodiment of the present disclosure.

The information processing device or the like according to the present embodiment mainly includes a CPU 901, a ROM 902, and a RAM 903. In addition, the information processing device or the like further includes a host bus 904, a bridge 905, an external bus 906, an interface 907, an input device 908, an output device 909, a storage device 910, a drive 912, a connection port 914, and a communication device 916.

The CPU 901 functions as an arithmetic processing device and a control device, and controls an overall operation in the information processing device or the like or a part thereof according to various programs recorded in the ROM 902, the RAM 903, the storage device 910, or a removable recording medium 913. The ROM 902 stores a program, a calculation parameter, and the like used by the CPU 901. The RAM 903 primarily stores the program used by the CPU 901, a parameter that changes as appropriate during execution of the program, and the like. These are connected to each other by the host bus 904 configured by using an internal bus such as a CPU bus. For example, the height estimation unit 131, the position estimation unit 132, the distance measurement unit 133, the communication control unit 134, the command generation unit 136, or the UI control unit 138 illustrated in FIG. 3 can be implemented by the CPU 901. In addition, the height estimation unit 211, the position estimation unit 212, the communication control unit 213, the airframe control unit 214, or the platform control unit 215 illustrated in FIG. 5 or 20 can be implemented by the CPU 901. Furthermore, the parameter generation unit 221 or the report information generation unit 222 illustrated in FIG. 6 or 21 can be implemented by the CPU 901.

The host bus 904 is connected to the external bus 906 such as a peripheral component interconnect/interface (PCI) bus via the bridge 905. In addition, the input device 908, the output device 909, the storage device 910, the drive 912, the connection port 914, and the communication device 916 are connected to the external bus 906 via the interface 907.

The input device 908 is an operating means operated by the user, such as a mouse, a keyboard, a touch panel, a button, a switch, a lever, or a pedal. Further, the input device 908 may be, for example, a remote control means (so-called remote controller) using infrared rays or other radio waves, or may be an external connection device 915 such as a mobile phone or PDA that supports the operation of the information processing device or the like. In addition, the input device 908 is configured by using, for example, an input control circuit that generates an input signal based on information input by the user using the above operating means and outputs the input signal to the CPU 901. By operating the input device 908, the user of the information processing device or the like can input various data to the information processing device or the like and instruct a processing operation.

The output device 909 is configured by using a device capable of visually or audibly notifying the user of acquired information. Examples of such a device include a display device such as a CRT display device, a liquid crystal display device, a plasma display device, an EL display device, or a lamp, an audio output device such as a speaker or a headphone, a printer device, and the like. The output device 909 outputs, for example, a result obtained by various processing performed by the information processing device or the like. Specifically, the display device displays the result obtained by various processing performed by the information processing device as text or an image. On the other hand, the audio output device converts an audio signal composed of reproduced audio data, acoustic data, or the like into an analog signal and outputs the analog signal.

The storage device 910 is a data storage device configured as an example of the storage unit of the information processing device or the like. The storage device 910 is configured by using, for example, a magnetic storage device such as a hard disk drive (HDD), a semiconductor storage device, an optical storage device, or a magneto-optical storage device. The storage device 910 stores a program executed by the CPU 901, various data, and the like. For example, the storage unit 137 illustrated in FIG. 3, the storage unit 225 illustrated in FIG. 6, the storage unit 225 illustrated in FIG. 21, or the like can be implemented by the storage device 910.

The drive 912 is a reader/writer for a recording medium, and is built in or externally attached to the information processing device or the like. The drive 912 reads information recorded in the removable recording medium 913 such as the mounted magnetic disk, optical disk, magneto-optical disk, or semiconductor memory, and outputs the information to the RAM 903. Further, the drive 912 can also write a record in the removable recording medium 913 such as the mounted magnetic disk, optical disk, magneto-optical disk, or semiconductor memory. Examples of the removable recording medium 913 include a DVD medium, an HD-DVD medium, and a Blu-ray (registered trademark) medium. Further, the removable recording medium 913 may be a compact flash (CF) (registered trademark), a flash memory, a secure digital (SD) memory card, or the like. Further, the removable recording medium 913 may be, for example, an integrated circuit (IC) card or electronic device that is equipped with a non-contact type IC chip.

The connection port 914 is a port for direct connection to the information processing device or the like. Examples of the connection port 914 include a universal serial bus (USB) port, an IEEE1394 port, and a small computer system interface (SCSI) port. Other examples of the connection port 914 include an RS-232C port, an optical audio terminal, and a high-definition multimedia interface (HDMI) (registered trademark) port. By connecting the external connection device 915 to the connection port 914, the information processing device or the like acquires various data directly from the external connection device 915 and provides various data to the external connection device 915.

The communication device 916 is, for example, a communication interface configured by using a communication device or the like for connection to a communication network (network) 917. The communication device 916 is, for example, a communication card for a wired or wireless local area network (LAN), Bluetooth (registered trademark), wireless USB (WUSB), or the like. Further, the communication device 916 may be a router for optical communication, a router for asymmetric digital subscriber line (ADSL), a modem for various types of communication, or the like. The communication device 916 can transmit and receive a signal and the like to and from, for example, the Internet and another communication device in accordance with a predetermined protocol such as TCP/IP. Further, the communication network 917 connected to the communication device 916 is configured by using a network or the like connected in a wire or wireless manner, and may be, for example, the Internet, a home LAN, infrared communication, radio wave communication, or satellite communication.

Hereinabove, an example of the hardware configuration capable of realizing the functions of the information processing device or the like included in the information processing system 1 according to an embodiment of the present disclosure has been described. Each component described above may be configured by using a general-purpose member, or may be configured by hardware specialized for the function of each component. Therefore, it is possible to appropriately change the hardware configuration to be used according to the technical level at the time of implementing the present embodiment. Note that, although not illustrated in FIG. 22, various components corresponding to the information processing device or the like included in the information processing system 1 or 2 are naturally included.

Note that it is possible to create a computer program for implementing each function of the information processing device or the like included in the information processing system 1 or 2 according to the present embodiment as described above and install the computer program in a personal computer or the like. Further, it is possible to provide a computer-readable recording medium in which such a computer program is stored. Examples of the recording medium include a magnetic disk, an optical disk, a magneto-optical disk, and a flash memory. Further, the computer program described above may be distributed via, for example, a network without using the recording medium. Furthermore, the number of computers that execute the computer program is not particularly limited. For example, a plurality of computers (for example, a plurality of servers and the like) may execute the computer program in cooperation with each other.

5. Supplementary Description

As described above, the preferred embodiments of the present disclosure have been described in detail with reference to the accompanying drawings, but the technical scope of the present disclosure is not limited to such examples. It will be apparent to those skilled in the art to which the present disclosure pertains that various modified examples or alterations can be conceived within the scope of the technical idea described in the claims and it is naturally understood that these modified examples or alterations fall within the technical scope of the present disclosure.

The display unit 16 of the piloting device 10 may display the movement ratio and the values used to calculate the movement ratio before the position of the mobile body 20 is synchronized with the movement amount of the piloting device 10. This may cause the pilot to determine whether or not to start the synchronization.

Further, the shaft configuration of the platform 24 is not limited to the configuration of the above-described embodiment, and for example, the pan shaft may be omitted.

Furthermore, the center of the display unit 16 or the center of the input/output unit 18 of the piloting device 10 may be aligned with an optical axis of a sensor of the stereo camera 14 or the like that measures the self-position and the distance to the gaze point. This allows the pilot to view a more natural movement displayed on the image capturing device 25 with respect to the movement of the piloting device 10, and the effect of the technology of the present disclosure is further enhanced.

In the first processing example of the above-described embodiment, the first distance and the second distance are the above-ground heights (the heights from the ground), but the present disclosure is not limited thereto. The first distance and the second distance may be heights from any place other than the ground.

The configuration of the piloting device 10 is not limited to the example of the above-described embodiment, and may be a tablet PC or a head mounted display (HMD).

Furthermore, the target in which the first and second gaze points are set is not limited to the example described in the above-described embodiment. For example, the image capturing target may be a basin, and the alternative target may be a puddle.

In the first processing example of the above-described embodiment, the first distance is the measured above-ground height of the piloting device 10, but the present disclosure is not limited thereto, and the first distance may be set in advance. For example, the first distance may be set to the height of the pilot or the like.

In addition, the steps illustrated in the flowcharts of the above-described embodiment include not only processing performed in chronological order according to the described order, but also processing performed in parallel or individually without necessarily being performed in chronological order. Furthermore, it goes without saying that the order of the steps processed in chronological order can be appropriately changed in some cases.

Furthermore, the effects described in the present specification are merely illustrative or exemplary and are not restrictive. That is, the technology according to the present disclosure can exhibit, in addition to or in place of the above-described effects, other effects obvious to those skilled in the art from the description of the present specification.

Note that the following configurations also fall within the technical scope of the present disclosure.

(1)
An information processing device comprising:
  a parameter generation unit that generates a movement parameter for controlling movement of a mobile body based on a ratio between a first distance from a reference body which is a reference for the movement of the mobile body to a first position and a second distance from the mobile body to a second position, and movement of the reference body.

(2)
The information processing device according to (1), wherein
  the parameter generation unit generates a movement amount of the mobile body as the movement parameter by multiplying the ratio by a movement amount of the reference body.

(3)
The information processing device according to (1) or (2), wherein
  the first distance is a height of the reference body, and
  the second distance is a height of the mobile body.

(4)
The information processing device according to any one of (1) to (3), wherein
  the first position is a first gaze point included in a field of view of a first image capturing device included in the reference body, and
  the second position is a second gaze point included in a field of view of a second image capturing device included in the mobile body.

(5)
The information processing device according to (4), wherein
  the second gaze point is included in an image capturing target captured by the second image capturing device, and
  the first gaze point is included in an alternative target that is an alternative of the image capturing target.

(6)
The information processing device according to (5), wherein
  a direction in which the first image capturing device views the first gaze point and a direction in which the second image capturing device views the second gaze point are the same as each other.

(7)
The information processing device according to any one of (1) to (6), wherein
  the parameter generation unit generates a first posture parameter for causing the mobile body to take a posture according to a posture of the reference body.

(8)
The information processing device according to any one of (1) to (7), wherein
  the mobile body includes a third image capturing device for capturing an image of a landscape.

(9)
The information processing device according to (8), wherein
  the mobile body includes a platform on which the third image capturing device is mounted, and
  the parameter generation unit generates a second posture parameter for causing the platform to take a posture according to a posture of the reference body.

(10)
The information processing device according to any one of (1) to (9), wherein
  the mobile body is a flying object.

(11)
The information processing device according to any one of (1) to (10), further comprising:
  a mobile body control unit that controls the movement of the mobile body based on the movement parameter.

(12)
The information processing device according to any one of (1) to (11), wherein
  the reference body includes a first distance acquisition unit, and
  the first distance is a distance acquired by the first distance acquisition unit.

(13)
The information processing device according to any one of (1) to (12), wherein
  the mobile body includes a second distance acquisition unit, and
  the second distance is a distance measured by the second distance acquisition unit.

(14)
The information processing device according to any one of (1) to (13), wherein
  the reference body and the mobile body are positioned away from each other and communicably connected to each other.

(15)
The information processing device according to any one of (1) to (14), wherein
  the reference body moves by being carried by a user.

(16)
An information processing method comprising:
  generating, by a processor, a movement parameter for controlling movement of a mobile body based on a ratio between a first distance from a reference body which is a reference for the movement of the mobile body to a first position and a second distance from the mobile body to a second position, and movement of the reference body.

(17)

A program causing a computer to perform:
a function of generating a movement parameter for controlling movement of a mobile body based on a ratio between a first distance from a reference body which is a reference for the movement of the mobile body to a first position and a second distance from the mobile body to a second position, and movement of the reference body.

10 PILOTING DEVICE
12 HOUSING
13 PROCESSING DEVICE
131 HEIGHT ESTIMATION UNIT
132 POSITION ESTIMATION UNIT
133 DISTANCE MEASUREMENT UNIT
134 COMMUNICATION CONTROL UNIT
135 COMMAND PROCESSING UNIT
136 COMMAND GENERATION UNIT
137 STORAGE UNIT
138 UI CONTROL UNIT
14 STEREO CAMERA
16 DISPLAY UNIT
18 INPUT/OUTPUT UNIT
20 MOBILE BODY
21 AIRFRAME
22a, 22b PROPELLER
23 STEREO CAMERA
24 PLATFORM
25 IMAGE CAPTURING DEVICE
26 DISTANCE MEASUREMENT SENSOR
27 CONTROL DEVICE
211 HEIGHT ESTIMATION UNIT
212 POSITION ESTIMATION UNIT
213 COMMUNICATION CONTROL UNIT
214 AIRFRAME CONTROL UNIT
215 PLATFORM CONTROL UNIT
220 INFORMATION PROCESSING DEVICE
221 PARAMETER GENERATION UNIT
222 REPORT INFORMATION GENERATION UNIT
225 STORAGE UNIT
28 PROPELLER DRIVING UNIT
29 PLATFORM DRIVING UNIT
30 MOBILE BODY
412 RELATIVE MOVEMENT AMOUNT
513 RELATIVE MOVEMENT AMOUNT
600 IMAGE CAPTURING TARGET
708 SECOND GAZE POINT
710 ALTERNATIVE TARGET
720 FIRST GAZE POINT

The invention claimed is:

1. An information processing device, comprising:
a central processing unit (CPU) configured to:
control a mobile body, in a flight mode, to reach a first height;
acquire a command for transition of a mode of the mobile body from the flight mode to a direct piloting mode, wherein
the acquired command comprises first information indicating a second height of a piloting device from a first position, and
the first position is on a ground below the piloting device;
acquire, subsequent to the acquisition of the command, second information indicating the first height of the mobile body from a second position, wherein
the second position is on a ground below the mobile body, and
the mobile body includes an image capturing device;
calculate a ratio by division of the first height of the mobile body by the second height of the piloting device;
acquire third information indicating a movement amount of the piloting device;
generate a movement parameter by multiplication of the movement amount of the piloting device with the calculated ratio;
control a movement amount of the mobile body in the direct piloting mode, based on the generated movement parameter;
generate a first posture parameter based on a tilt angle and a roll angle of the piloting device; and
control, based on the generated first posture parameter, a posture of the image capturing device such that a tilt angle and a roll angle of the image capturing device is same as the tilt angle and the roll angle of the piloting device.

2. The information processing device according to claim 1, wherein the CPU is further configured to:
generate a second posture parameter based on a posture of the piloting device; and
control, based on the generated second posture parameter, the mobile body to take the posture of the piloting device.

3. The information processing device according to claim 1, wherein the image capturing device captures an image of a landscape.

4. The information processing device according to claim 3, wherein
the mobile body further includes a platform that mounts the image capturing device, and
the CPU is further configured to control, based on the generated first posture parameter, the platform such that the tilt angle and the roll angle of the image capturing device is same as the tilt angle and the roll angle of the piloting device, respectively.

5. The information processing device according to claim 1, wherein the mobile body is a flying object.

6. The information processing device according to claim 1, wherein
the piloting device includes a sensor, and
the second height of the piloting device is measured by the sensor.

7. The information processing device according to claim 1, wherein
the mobile body further includes a sensor, and
the first height of the mobile body is measured by the sensor.

8. The information processing device according to claim 1, wherein
the piloting device is positioned away from the mobile body, and
the piloting device is communicably connected to the mobile body.

9. The information processing device according to claim 1, wherein the movement amount of the piloting device is based on a movement amount of a user.

10. The information processing device according to claim 1, wherein the mobile body further includes a platform and an airframe, the image capturing device is attached to the airframe via the platform, the CPU is further configured to:
- calculate a difference between a target position of the airframe and a current position of the airframe; and
- control the platform to change a current position of the platform to a target position of the platform, and the target position of the platform is equal to the difference between the target position of the airframe and the current position of the airframe.

11. An information processing method, comprising:

controlling a mobile body, in a flight mode, to reach a first height;

acquiring, by a processor, a command for transition of a mode of the mobile body from the flight mode to a direct piloting mode, wherein
- the acquired command comprises first information indicating a second height of a piloting device from a first position, and
- the first position is on a ground below the piloting device;

acquiring, by the processor, subsequent to the acquisition of the command, second information indicating the first height of the mobile body from a second position, wherein
- the second position is on a ground below the mobile body, and
- the mobile body includes an image capturing device;

calculating, by the processor, a ratio by division of the first height of the mobile body by the second height of the piloting device;

acquiring, by the processor, third information indicating a movement amount of the piloting device;

generating, by the processor, a movement parameter by multiplication of the movement amount of the piloting device with the calculated ratio;

controlling, by the processor, a movement amount of the mobile body in the direct piloting mode, based on the generated movement parameter;

generating, by the processor, a posture parameter based on a tilt angle and a roll angle of the piloting device; and controlling, by the processor, based on the generated posture parameter, a posture of the image capturing device such that a tilt angle and a roll angle of the image capturing device is same as the tilt angle and the roll angle of the piloting device.

12. A non-transitory computer-readable medium having stored thereon, computer-executable instructions which, when executed by a computer, cause the computer to execute operations, the operations comprising:

controlling a mobile body, in a flight mode, to reach a first height;

acquiring a command for transition of a mode of the mobile body from the flight mode to a direct piloting mode, wherein
- the acquired command comprises first information indicating a second height of a piloting device from a first position, and
- the first position is on a ground below the piloting device;

acquiring, subsequent to the acquisition of the command, second information indicating the first height of the mobile body from a second position, wherein
- the second position is on a ground below the mobile body, and
- the mobile body includes an image capturing device;

calculating a ratio by division of the first height of the mobile body by the second height of the piloting device;

acquiring third information indicating a movement amount of the piloting device;

generating a movement parameter by multiplication of the movement amount of the piloting device with the calculated ratio;

controlling a movement amount of the mobile body in the direct piloting mode, based on the generated movement parameter;

generating a posture parameter based on a tilt angle and a roll angle of the piloting device; and controlling, based on the generated posture parameter, a posture of the image capturing device such that a tilt angle and a roll angle of the image capturing device is same as the tilt angle and the roll angle of the piloting device.

* * * * *